US010521232B2

(12) United States Patent
Seal et al.

(10) Patent No.: US 10,521,232 B2
(45) Date of Patent: *Dec. 31, 2019

(54) DATA PROCESSING APPARATUS AND METHOD FOR PROCESSING A SIMD INSTRUCTION SPECIFYING A CONTROL VALUE HAVING A FIRST PORTION IDENTIFYING A SELECTED DATA SIZE AND A SECOND PORTION IDENTIFYING AT LEAST ONE CONTROL PARAMETER HAVING A NUMBER OF BITS THAT VARIES IN DEPENDENCE ON A NUMBER OF BITS COMPRISED BY THE FIRST PORTION

(71) Applicant: ARM Limited, Cambridge (GB)

(72) Inventors: David James Seal, Cambridge (GB); Richard Roy Grisenthwaite, Nr Royston (GB); Nigel John Stephens, London (GB)

(73) Assignee: ARM Limited, Cambridge (GB)

( * ) Notice: Subject to any disclaimer, the term of this patent is extended or adjusted under 35 U.S.C. 154(b) by 167 days.

This patent is subject to a terminal disclaimer.

(21) Appl. No.: 15/431,955

(22) Filed: Feb. 14, 2017

(65) Prior Publication Data

US 2017/0153891 A1    Jun. 1, 2017

Related U.S. Application Data

(62) Division of application No. 14/878,188, filed on Oct. 8, 2015, now Pat. No. 9,619,225, which is a division
(Continued)

(30) Foreign Application Priority Data

Nov. 23, 2010   (GB) .................................. 1019798.6

(51) Int. Cl.
*G06F 9/30*        (2018.01)
*G06F 9/38*        (2018.01)
*G06F 7/76*        (2006.01)

(52) U.S. Cl.
CPC ........ *G06F 9/30167* (2013.01); *G06F 9/3016* (2013.01); *G06F 9/30018* (2013.01);
(Continued)

(58) Field of Classification Search
CPC ............. G06F 9/30018; G06F 9/30032; G06F 9/30036; G06F 9/30145; G06F 9/30167
See application file for complete search history.

(56) References Cited

U.S. PATENT DOCUMENTS 4,520,439 A    5/1985  Liepa
4,617,641 A    10/1986 Hamada
(Continued)

FOREIGN PATENT DOCUMENTS

CN   100465880   3/2009
EP   0 703 529   3/1996
(Continued)

OTHER PUBLICATIONS

Kreitzer et al., "Understanding Assembly Language for IA-32 and Intel 64 Architectures—Part 1: Basic overview and instruction set extensions", Mar. 15, 2010, 9 pages.*
(Continued)

*Primary Examiner* — David J. Huisman
(74) *Attorney, Agent, or Firm* — Nixon & Vanderhye P.C.

(57) ABSTRACT

A data processing apparatus comprises a processing circuit and instruction decoder. A bitfield manipulation instruction controls the processing apparatus to generate at least one result data element from corresponding first and second source data elements. Each result data element includes a portion corresponding to a bitfield of the corresponding first
(Continued)

Control13 <12:0>:

| <12> | <11:6> | <5:0> | data element size N | rotation parameter R | Most significant bit position S | reversal information V |
|---|---|---|---|---|---|---|
| 1 | r r r r r r | s s s s s s | 64 | UInt(rrrrrr) | UInt(ssssss) | 0 0 0 0 0 0 |
| 0 | v r r r r r | 0 s s s s s | 32 | UInt(rrrrr) | UInt(sssss) | V 0 0 0 0 0 |
| 0 | v v r r r r | 1 0 s s s s | 16 | UInt(rrrr) | UInt(ssss) | V V 0 0 0 0 |
| 0 | v v v r r r | 1 1 0 s s s | 8 | UInt(rrr) | UInt(sss) | V V V 0 0 0 |
| 0 | v v v v r r | 1 1 1 0 s s | 4 | UInt(rr) | UInt(ss) | V V V V 0 0 |
| 0 | v v v v v r | 1 1 1 1 0 s | 2 | UInt(r) | UInt(s) | V V V V V 0 |
| 0 | v v v v v v | 1 1 1 1 1 0 | 1 | 0 | 0 | V V V V V V |
| 0 | x x x x x x | 1 1 1 1 1 1 | UNDEFINED | | | |

1st portion 30 / 2nd portion 32 / 1st portion 30 / 2nd portion 32 source data element. Bits of the result data element that are more significant than the inserted bitfield have a prefix value that is selected, based on a control value specified by the instruction, as one of a first prefix value having a zero value, a second prefix value having the value of a portion of the corresponding second source data element, and a third prefix value corresponding to a sign extension of the bitfield of the first source data element.

10 Claims, 13 Drawing Sheets

Related U.S. Application Data of application No. 13/137,948, filed on Sep. 22, 2011, now Pat. No. 9,207,937.

(52) U.S. Cl.
CPC ...... *G06F 9/30032* (2013.01); *G06F 9/30036* (2013.01); *G06F 9/30109* (2013.01); *G06F 9/30112* (2013.01); *G06F 9/30145* (2013.01); *G06F 9/3887* (2013.01); *G06F 7/764* (2013.01); *G06F 7/768* (2013.01)

(56) References Cited

U.S. PATENT DOCUMENTS

| | | | |
|---|---|---|---|
| 4,841,438 | A | 6/1989 | Yoshida |
| 5,423,010 | A | 6/1995 | Mizukami |
| 5,669,012 | A | 9/1997 | Shimizu et al. |
| 6,308,253 | B1 | 10/2001 | Gadre et al. |
| 6,625,724 | B1 | 9/2003 | Kahn |
| 6,678,806 | B1 | 1/2004 | Redford |
| 6,799,267 | B2 | 9/2004 | Kojima et al. |
| 7,260,711 | B2 | 8/2007 | Symes |
| 7,315,937 | B2 | 1/2008 | Jones et al. |
| 7,529,918 | B2 | 5/2009 | Taunton |
| 9,207,937 | B2 | 12/2015 | Seal et al. |
| 9,619,225 | B2 * | 4/2017 | Seal .................. G06F 9/30018 |
| 2003/0023646 | A1 | 1/2003 | Lin et al. |
| 2005/0198474 | A1 | 9/2005 | Nancekievill et al. |
| 2005/0204117 | A1 | 9/2005 | Carpenter et al. |
| 2006/0101248 | A1 | 5/2006 | Nie et al. |
| 2007/0252733 | A1 | 11/2007 | Thebault et al. |
| 2007/0299898 | A1 | 12/2007 | Richey et al. |
| 2010/0299506 | A1 | 11/2010 | Greiner et al. |
| 2011/0072065 | A1 * | 3/2011 | Mimar ................ G06F 9/30018 708/402 |

FOREIGN PATENT DOCUMENTS

| | | |
|---|---|---|
| EP | 0 945 783 | 9/1999 |
| JP | H04-167134 | 6/1992 |
| JP | H07-168715 | 7/1995 |
| JP | H07-175651 | 7/1995 |
| JP | H08-95780 | 4/1996 |
| JP | H09-114639 | 5/1997 |
| JP | 2000-99327 | 4/2000 |
| JP | 2008-83795 | 4/2008 |
| WO | WO 02/17072 | 2/2002 |
| WO | WO 2004/088503 | 10/2004 |

OTHER PUBLICATIONS

English translation of Korean Office Action dated Jan. 31, 2017 in KR 10-2013-7013056, 2 pages.
English translation of Korean Office Action dated Dec. 19, 2017 in KR 10-2017-7027796, 6 pages.
U.S. Appl. No. 14/878,188, filed Oct. 8, 2015, Inventor: Seal et al.
Office Action dated Jun. 16, 2016 in co-pending U.S. Appl. No. 14/878,188 21 pages.
UK Search Report dated Feb. 22, 2011 for GB 1019798.6, 3 pages.
UK Search Report dated Aug. 12, 2011 for GB 1019798.6, 2 pages.
H. Kang et al, "A Scalable SIMD Digital Signal Processor for High Quality Multifunctional Printer Systems" Proceedings of the SPIE—The International Society for Optical Engineering, Jan. 2005, 9 pages.
J. Redford, "A Three Giga-Op DSP Chip for Image Processing" Proceedings of IPCIP'98 International Conference on Image Processing, Oct. 1998, pp. 981-984.
Partial PCT Search Report dated Dec. 13, 2011 in PCT/GB2011/051841, 6 pages.
International Search Report and Written Opinion of the International Searching Authority dated Feb. 6, 2012 in PCT/GB2011/051841, 24 pages.
International Preliminary Report on Patentability dated Dec. 18, 2012 in PCT/GB2011/051841, 30 pages.
European Communication dated Apr. 1, 2014 in EP 11 771 268.7, 4 pages.
Japanese Office Action dated Sep. 29, 2014 in JP 2013-539334 and English translation, 6 pages.
Office Action and Search Report dated Dec. 26, 2014 from Chinese Application No. 201180056035.1, pp. 1-6.
English translation of Chinese Second Office Action dated Aug. 19, 2015 in CN201180056035.1, 4 pages.
English translation of Japanese Office Action dated Oct. 26, 2015 issued in JP 2014-255950, 7 pages.

* cited by examiner

| Control13 <12:0>: | | | data element size N | rotation parameter R | Most significant bit position S | reversal information V |
|---|---|---|---|---|---|---|
| <12> | <11:6> | <5:0> | | | | |
| 1 | r r r r r r | s s s s s s | 64 | UInt(rrrrrr) | UInt(ssssss) | 0 0 0 0 0 0 |
| 0 | v r r r r r | 0 s s s s s | 32 | UInt(rrrrr) | UInt(sssss) | V 0 0 0 0 0 |
| 0 | v v r r r r | 1 0 s s s s | 16 | UInt(rrrr) | UInt(ssss) | V V 0 0 0 0 |
| 0 | v v v r r r | 1 1 0 s s s | 8 | UInt(rrr) | UInt(sss) | V V V 0 0 0 |
| 0 | v v v v r r | 1 1 1 0 s s | 4 | UInt(rr) | UInt(ss) | V V V V 0 0 |
| 0 | v v v v v r | 1 1 1 1 0 s | 2 | UInt(r) | UInt(s) | V V V V V 0 |
| 0 | v v v v v v | 1 1 1 1 1 0 | 1 | 0 | 0 | V V V V V V |
| 0 | x x x x x x | 1 1 1 1 1 1 | UNDEFINED | | | |

1st portion 30
2nd portion 32

FIG. 5

Control13 <12:0>:

| <12> | <11:6> | <5:0> | pattern repetition size N | pattern rotation parameter R | pattern width parameter S |
|---|---|---|---|---|---|
| 1 | rrrrrr | ssssss | 64 | UInt(rrrrrr) | UInt(ssssss) |
| 0 | xrrrrr | 0sssss | 32 | UInt(rrrrr) | UInt(sssss) |
| 0 | xxrrrr | 10ssss | 16 | UInt(rrrr) | UInt(ssss) |
| 0 | xxxrrr | 110sss | 8 | UInt(rrr) | UInt(sss) |
| 0 | xxxxrr | 1110ss | 4 | UInt(rr) | UInt(ss) |
| 0 | xxxxxr | 11110s | 2 | UInt(r) | UInt(s) |
| 0 | xxxxxx | 111110 | 1 | 0 | 0 |
| 0 | xxxxxx | 111111 | UNDEFINED | | | opc = 00 → result = src AND mask opc = 01 → result = src OR mask opc = 10 → result = src XOR mask

DATA PROCESSING APPARATUS AND METHOD FOR PROCESSING A SIMD INSTRUCTION SPECIFYING A CONTROL VALUE HAVING A FIRST PORTION IDENTIFYING A SELECTED DATA SIZE AND A SECOND PORTION IDENTIFYING AT LEAST ONE CONTROL PARAMETER HAVING A NUMBER OF BITS THAT VARIES IN DEPENDENCE ON A NUMBER OF BITS COMPRISED BY THE FIRST PORTION

This application is a divisional of U.S. patent application Ser. No. 14/878,188 filed Oct. 8, 2015, now U.S. Pat. No. 9,619,225, which is a divisional of U.S. patent application Ser. No. 13/137,948 filed Sep. 22, 2011, now U.S. Pat. No. 9,207,937, which claims priority to GB Application No. 1019798.6 filed Nov. 23, 2010, the entire contents of each of which are hereby incorporated by reference in this application.

BACKGROUND

The present invention relates to the field of data processing. In data processing systems, a data value may sometimes contain a number of adjacent bits whose values are of interest independently from the rest of the data value. Such a group of adjacent bits can be referred to as a bitfield, and the number of adjacent bits in the group can be referred to as its width. For example, a data value representing an RGB colour value may include bitfields representing the red, green and blue components respectively. Sometimes it may be desirable to manipulate the data value containing the bitfield so as to isolate the bitfield from its surroundings. For example, one may desire to extract or replace only the green component of the RGB colour value. The present technique seeks to provide an efficient encoding of a bitfield manipulation instruction that can control a processing apparatus to perform a wide variety of different kinds of bitfield manipulations.

In the present application the notation <X:Y> indicates a group of adjacent bits extending from a most significant bit at bit position X to a least significant bit at bit position Y. The width of a group described by <X:Y> is X−Y+1 bits. For example, the expression<4:0> indicates the group of width 5 bits at bit positions 4 to 0, where bit <4> is more significant than bit <0>. Note that the notation <X:Y> does not imply any particular storage order of the bits within a storage location, since the storage order need not be the same as the order of significance (e.g. big-endian or little-endian storage formats may be used).

In the present application the prefix 0b followed by a sequence of 1s and 0s represents a numeric value in binary notation. For example 0b110 represents the value 6 in decimal notation,

SUMMARY

Viewed from one aspect, the present invention provides a data processing apparatus comprising:
processing circuitry configured to perform processing operations;
an instruction decoder responsive to program instructions to generate control signals for controlling said processing circuitry to perform said processing operations;
wherein:
said program instructions include a bitfield manipulation instruction identifying at least a first source data value comprising at least one first source data element each having N bits <N−1:0>, a second source data value comprising at least one second source data element each having N bits <N−1:0>, and a control value;
said control value includes information for indicating a bitfield width W, a source bit position A and a result bit position B, where 1≤W≤N, 0≤A≤(N−W) and 0≤B≤(N−W); and
said instruction decoder is responsive to said bitfield manipulation instruction to generate control signals for controlling said processing circuitry to generate a result data value comprising at least one result data element, each result data element corresponding to a corresponding first source data element and a corresponding second source data element, each result data element having N bits <N−1:0> comprising:
(a) bits <B+W−1:B> having bit values corresponding to bits <A+W−1:A> of said corresponding first source data element; and
(b) if B+W≤N, bits <N−1:B+W> having bit values corresponding to a prefix value selected, in dependence on said control value, as one of (i) a first prefix value comprising bits each having a zero value, (ii) a second prefix value having the bit values of bits <N−1:B+W> of said corresponding second source data element, and (iii) a third prefix value having bit values corresponding to a sign extension of bits <A+W−1:A> of said corresponding first source data element.

The processing apparatus is provided with a processing circuit and an instruction decoder that is responsive to a bitfield manipulation instruction to control the processing circuit to perform a bitfield manipulation operation. The bitfield manipulation instruction identifies at least a first source data value comprising at least one first source data element and a second source data value comprising at least one second source data element. In response to the bitfield manipulation instruction, the processing circuit is controlled to generate a result data value comprising at least one result data element. Each first source data element, second source data element and result data element has N bits <N−1:0>.

Each N-bit result data element includes W bits <B+W−1:B> that have bit values corresponding to bits <A+W−1:A> of a corresponding first source data element of the first source data value. Hence, each result data element includes a W-bit bitfield extracted from the corresponding first source data element. The source bit position A indicates the position of the least significant bit of the bitfield within the first source data element, the result bit position B indicates the least significant bit of the bitfield within the result data element, and the bitfield width W indicates the number of bits comprised by the bitfield. The quantities A, B and W lie within the range 1≤W≤N, 0≤A≤N−W and 0≤B≤N−W and are identified by a control value within the bitfield manipulation instruction. The control value may identify A, B and W directly, or indirectly using any set of parameters which can be used to derive A, B and W. Note that the control value need not be a set of consecutive bits within the bitfield manipulation instruction encoding, but may also comprise two or more groups of bits distributed throughout the instruction encoding.

If the control value indicates that B+W≤N, then each result data element will include a prefix portion comprising bits <N−1:B+W> that are more significant than the most significant bit <B+W−1> of the bitfield within the result data element. The present technique provides different options for setting the bit values of the prefix portion. The control value of the bitfield manipulation instruction includes information indicating what type of prefix portion is to be used for a particular bitfield manipulation. In dependence on the control value, the prefix value is selected as one of a first prefix value, a second prefix value and a third prefix value.

The first prefix value comprises bits each having a zero value. When the first prefix value is selected then each result data element contains a bitfield extracted from the corresponding source data element, with any more significant bits than the bitfield being set to zero. This can be useful for isolating a bitfield of the source data element so that the value of the bitfield can be processed separately from other parts of the source data element.

The second prefix value has the bit values of bits <N−1:B+W> of the corresponding second source data element. Hence, when the second prefix value is selected, then the bitfield manipulation produces a result equivalent to inserting within the second source data element a bitfield of the first source data element, with any more significant bits of the second source data element remaining unchanged. This can be useful for combining parts of two or more data values into a single data value. For example, a combined RGB colour value can be assembled from separate RGB component values by using bitfield manipulation instructions of the second prefix form to insert, within a data value containing one of the RGB components, bitfields corresponding to the other two components.

The third prefix value has bit values corresponding to a sign extension of bits <A+W−1:A> of the corresponding first source data element. This is useful for bitfields representing signed values, because the sign extension preserves the sign of the bitfield of the first source data element when it is included within the result data element. For example, if the bitfield <A+W−1:A> extracted from the first source data element was representing a negative number, then the sign extension provided by the third prefix value maintains the negative sign of the bitfield within the result data element.

By selecting an appropriate one of the first, second and third prefix values, different kinds of bitfield manipulations can be encoded by the same bitfield manipulation instruction. As a single bitfield manipulation instruction can provide multiple different manipulation operations, the encoding space of the instruction set is used efficiently. The skilled person will appreciate that the hardware for implementing the bitfield manipulation instruction may have a wide variety of different forms and that the processing circuitry and instruction decoder may comprise any kind of hardware that generates a result value having at least one result data element of the form described above.

The sign extension bits of the third prefix value may have different forms depending on the type of sign representation used for the data values. However, in one example the third prefix value may comprise bits each having the bit value of bit <A+W−1> of the corresponding first source data element. In many binary signed number representations, the sign bit which indicates whether a data value is positive or negative is the most significant bit of that data value. The most significant bit of the bitfield extracted from the first source data element is bit <A+W−1> and so by replicating this bit in each of the bits of the third prefix value, the sign of the extracted bitfield is maintained when that bitfield is inserted within the result data value.

If the control value defines the result bit position B to be greater than zero, then the result data element has a suffix portion including at least one bit <B−1:0> that is less significant than the least significant bit <B> of the bitfield. In dependence on the control value, the suffix value may be selected as one of a first suffix value comprising bits each having a zero value, and a second suffix value having bit values of bits <B−1:0> of the corresponding second source data element. By selecting the first suffix value, the bitfield can be isolated within the result data element with less significant bits having zero values. By using the second suffix value, the bitfield manipulation effectively inserts the bitfield of the first source data element within the second source data element with the less significant bits of the second source data element being unchanged.

Although in the later described examples, an instruction encoding is described in which the second suffix value is selected when the second prefix value is selected, and the first suffix value is selected when one of the first and third prefix values is selected, it will be appreciated that any arbitrary combination of one of the first, second and third prefix values with one of the first and second suffix values may also be used.

The data processing apparatus may comprise a plurality of storage locations configured to store data values for processing by said processing circuitry;

wherein said bitfield manipulation instruction identifies at least a first source storage location for storing said first source data value, and a destination storage location; and said instruction decoder is responsive to said bitfield manipulation instruction to generate control signals for controlling said processing circuitry to store said result data value in said destination storage location.

In one example of the bitfield manipulation instruction, the instruction identifies at least a first source storage location for storing the first source data value and a destination storage location for storing the generated result data value. The storage locations may be, for example, registers, memory locations, or any other data store for storing data for processing by the processing circuitry.

Optionally, the bitfield manipulation instruction may specify a second source storage location for storing the second source data value, or the second source data value may be an immediate value identified directly within the instruction.

Alternatively, in one example the second source data value may be a data value present in the destination storage location prior to execution of the bitfield manipulation instruction. In this case, the result data value overwrites the second source data value within the destination storage location. If the control value of the bitfield manipulation instruction is such that the second prefix value and the second suffix value are selected, then the result of the bitfield manipulation is that the bitfield from the first source data value is inserted within the destination storage location with other bits of the destination storage location remaining unchanged.

Some processing apparatuses may allow storage locations (e.g. registers) to be accessed as storage locations of a plurality of different storage location sizes. The control value of the bitfield manipulation instruction may therefore include information for identifying the storage location size of the first source storage location and destination storage location. The storage locations may be implemented in different ways. In one example, there may be physically distinct storage locations having different sizes (for example one group of 64-bit storage locations and another group of 32-bit storage locations). Alternatively, a common set of storage locations may be accessible with different storage location sizes. For example, the same 64-bit storage location may be subject to a 64-bit data access and a 32-bit data access. During a 32-bit data access of the 64-bit storage location, only 32 of the bits of the storage location could be read, or alternatively all 64 bits of the storage location may be read but then 32 of the bits may be discarded before performing any further processing of the data value. Likewise when a 32-bit data value is written to a 64-bit storage location, the other 32 bits may be set to some predetermined value, or to a sign extension of the 32-bit data, or left unchanged.

In some embodiments, the one or more data elements included within the first source data value, the second source data value and the result data value may have a data element size N that is selected from among a plurality of different data element sizes. In this case, then the control value of the bitfield manipulation instruction may also include information for, directly or indirectly, identifying the data element size N. Providing variable data element sizes can be useful, for example, for single instruction multiple data (SIMD) processing operations, where the bitfield manipulation is applied in parallel to multiple sets of corresponding data elements within the first source data value, second source data value and result data value.

The bit positions A and B indicating the position of the bitfield within the first source data element and the result data element are identified by the control value of the bitfield manipulation instruction. In one example of the bitfield manipulation instruction, the control value may identify any arbitrary values of A and B, so that a bitfield from any position within the source data element can be copied to any location within the result data element.

However, in one example the bitfield manipulation instruction has an encoding such that one of the source bit position A and the result bit position B has a value of zero. The present technique recognises that for the most commonly desired types of bitfield manipulation operation, at least one of the source bit position A and the result bit position B is zero. By setting one of A and B to be equal to zero, then only the non-zero one of A and B needs to be identified by the control value and so the instruction encoding becomes more efficient. In a bitfield insertion form of the instruction, A=0 and B>0, such that a bitfield positioned at the least significant portion <W−1:0> of the source data element is inserted into an arbitrary portion <B+W−1:B> of the result data element. In a bitfield extraction form of the instruction, A>0 and B=0, such that a bitfield is extracted from an arbitrary portion <A+W−1:A> of the source data element and copied to the least significant portion <W−1:0> of the result data element. The extraction and insertion forms of the instruction satisfy the most common forms of bitfield manipulation. Nevertheless, if a bitfield manipulation is desired for which non-zero values of both A and B are desired, then this can still be performed using two bit field manipulation instructions: an instruction of the bitfield extraction form to extract the source bitfield from the arbitrary position A of the source value and copy the bitfield to a least significant portion of a temporary storage location, and an instruction of the bitfield insertion form which takes the bitfield from the least significant portion of the temporary storage location and inserts this bitfield into the arbitrary position B within a result value.

In one example, the apparatus may be configured such that said control value specifies a most significant bit position S and an element rotation parameter R for determining said bitfield width W, said source bit position A and said result bit position B;

if S≥R, then said source bit position A=R and said result bit position B=0, said bitfield width W=(S+1)−R and said bitfield manipulation instruction has said bitfield extraction form; and if S<R, then said source bit position A=0 and said result bit position B=N−R, said bitfield width W=S+1, and said bitfield manipulation instruction has said bitfield insertion form.

This encoding of the bitfield manipulation instruction is particularly efficient because two parameters S and R are sufficient to identify at least: (a) whether the bitfield manipulation instruction is of the bitfield extraction form or the bitfield insertion form, (b) the source bit position A indicating the position of the bitfield within the first source data element, (c) the result bit position B indicating the position of the bitfield within the result data element, and (d) the bitfield width W indicating the number of bits comprised by the bitfield.

For both the bitfield insertion form and the bitfield extraction form, the most significant bit position S represents the bit position of the most significant bit of the bitfield within the first source data element, and the element rotation parameter R represents the number of bit positions by which each source data element would be rotated right if the source bit position A was moved to the result bit position B. For the bitfield insertion form, R represents the bit position of the least significant bit of the bitfield within the first source data element, while for the bitfield extraction form the value of (N−R) identifies the least significant bit position of the bitfield within the result data element (where N is the data element size).

While the element rotation parameter R represents the number of bit positions by which each source data element would be rotated right if the source bit position A was moved to the result bit position B, it is not essential to actually perform a right rotation when generating the result data element from the first source data element. For example, an equivalent left rotation may be used instead of the right rotation, or the result data element may be generated without actually performing a rotation.

In one example, the most significant bit position S may comprise a bitfield sign-bit parameter S. If the first source data element is a signed data value, then the most significant bit position S also identifies the position of the sign bit within the first source data element (in addition to identifying items (a) to (d) mentioned above).

The apparatus may be arranged so that said control value includes a first portion and a second portion each comprising a variable number of bits; and at least one of said instruction decoder and said processing circuitry is responsive to said bitfield manipulation instruction to determine the number of bits comprised by said first portion of said control value, and to determine based on the number of bits comprised by said first portion:
(a) a data element size N of said at least one first source data element, said at least one second source data element and said at least one result data element; and
(b) which bits of said second portion indicate said most significant bit position S and said rotation parameter R.

The larger the data element size N, the larger the possible values of R and S. Therefore, the number of bits which are required to represent R and S will vary in dependence on the data element size N selected for a particular operation. While it would be possible to assign within the control value a fixed number of bits that is sufficient to identify the maximum possible values of R and S, a more efficient encoding can be achieved by providing the control value with a first portion and a second portion each of variable length. Bits of the control value can be variably assigned to either the first portion or the second portion in dependence on the data element size N being used. By detecting the size of the variable length first portion, the apparatus can identify the data element size N and which bits of the second portion represent the most significant bit position S and rotation parameter R.

In some embodiments, the result data value may be generated with the result data elements arranged in the same order as the corresponding first and second source data elements within the first and second source data values.

However, other embodiments may be arranged so that if said first source data value comprises a plurality of first source data elements, said second source data value comprises a plurality of second source data elements and said result data value comprises a plurality of result data elements, then said control value includes data element ordering information for indicating an order with which said plurality of result data elements are arranged within said result data value.

Hence, the bitfield manipulation instruction can also be used to implement data element reordering if desired. For example, a result data value comprising two result data elements A and B may be generated based on a first source data value comprising corresponding first source data elements A' and B' and a second source data value comprising corresponding second source data elements A" and B". The data element ordering information indicated by the control value may then specify whether the result data elements are to be arranged in the order AB (corresponding to the order of the corresponding source data elements in the source data values) or in the opposite order BA.

Note that the bitfield manipulation instruction may, if desired, be used to implement a reordering of data elements within a data value, even if no bitfield manipulation is to be performed on that data value. This can be done by setting the bitfield width W to be the same as the data element size N, so that the bitfield manipulation operation has the effect of copying the entire first source data value to the result data value, with the data elements within the result data value being reordered depending on the data element ordering information. Hence, the present technique provides a versatile instruction that can implement not just bitfield manipulations but also reordering of data elements.

In one example embodiment, the apparatus may be configured such that if said first source data value comprises a plurality of first source data elements, said second source data value comprises a plurality of second source data elements and said result data value comprises a plurality of result data elements, then said result data value is equivalent to a first data value obtained by:
(a) generating an intermediate value comprising said result data elements ordered corresponding to the order of the corresponding first source data elements in said first source data value and the order of the corresponding second source data elements in said second source data value, and
(b) performing at least one reordering iteration on said result data elements within said intermediate value to generate said first data value;
each reordering iteration comprising determining whether a corresponding bit of said data element ordering information has a predetermined value, and if said corresponding bit of said data element ordering information has said predetermined value then exchanging pairs of groups of bits within said intermediate value.

In one example, the exchanged pairs of groups of bits within the intermediate value comprise adjacent pairs of groups of bits.

One way of implementing the data element reordering is to generate the result data value in a form that is equivalent to a first data value that would be generated if (a) using a bitfield manipulation operation as described above, an intermediate value was generated where the result data elements that result from the bitfield manipulation are ordered in the same order as the corresponding first and second source data elements within the first and second source data values, and (b) a series of one or more reordering iterations were applied to the intermediate value in order to generate the first data value, each reordering iteration comprising exchanging pairs of groups of bits within the intermediate value if a corresponding bit of the data element ordering information has a predetermined value.

Note that the result data value need not actually be generated by performing steps (a) and (b) as described above. In some implementations, the processing circuit may, in a single operation, generate the final result value in which the bitfield manipulation operation has been performed based on the first/second source data values and the result data elements have also been ordered in the desired order within the result data value. Hence, it is not necessary for the intermediate value described above to be generated by the processing circuit, or for the processing circuit to actually perform the reordering iterations. The final result data value has a value that is equivalent to the first data value that would result from performing such reordering iterations on the intermediate value.

While in some embodiments, the reordering iterations may exchange pairs of groups of bits having arbitrary numbers of bits, the encoding of the data element ordering information and the configuration of hardware for generating the result data value can be simplified if the groups of bits comprise numbers of bits that are multiples of the data element size N. For example, a reordering iteration may exchange pairs of single data elements, or exchange pairs of groups of two, four or more data elements.

In one example, the groups of bits may comprise different numbers of bits for different ones of the at least one reordering iteration. A series of reordering iterations for exchanging groups of bits (or data elements) of different group sizes enables a wide range of possible arrangements of data elements to be provided within the result data value.

The apparatus may be configured such that said control value includes a first portion and a second portion each comprising a variable number of bits; and
at least one of said instruction decoder and said processing circuitry is responsive to said bitfield manipulation instruction to determine the number of bits comprised by said first portion of said control value, and to determine based on the number of bits comprised by said first portion:
(a) a data element size N of said at least one first source data element, said at least one second source data element and said at least one result data element; and
(b) which bits of said second portion indicate said data element ordering information.

In a similar way to the parameters S and R described above, the data element ordering information may be encoded using the first portion and second portion each having a variable number of bits. This is useful because the data element ordering information will typically require a number of bits that is dependent upon how many data elements are present within the data values (the greater the number of data elements, the greater the number of reordering permutations that are possible). The number of data elements is dependent on the data element size N, and so the number of bits required to represent the data element ordering information may vary inversely with the data element size N (the greater the data element size, the fewer the number of reordering permutations that are possible). Hence, the encoding scheme for the control value as described above for the bitfield parameters S and R can similarly be used to represent the data element ordering information in an efficient manner.

Viewed from another aspect, the present invention provides a data processing apparatus comprising:

processing means for performing processing operations;

instruction decoding means for generating, in response to program instructions, control signals for controlling said processing circuitry to perform said processing operations; wherein:

said program instructions include a bitfield manipulation instruction identifying at least a first source data value comprising at least one first source data element each having N bits <N−1:0>, a second source data value comprising at least one second source data element each having N bits <N−1:0>, and a control value;

said control value includes information for indicating a bitfield width W, a source bit position A and a result bit position B, where 1≤W≤N, 0≤A≤N−W and 0≤B≤N−W; and said instruction decoding means is responsive to said bitfield manipulation instruction to generate control signals for controlling said processing means to generate a result data value comprising at least one result data element, each result data element corresponding to a corresponding first source data element and a corresponding second source data element, each result data element having N bits <N−1:0> comprising:

(a) bits <B+W−1:B> having bit values corresponding to bits <A+W−1:A> of said corresponding first source data element; and (b) if B+W≤N, bits <N−1:B+W> having bit values corresponding to a prefix value selected, in dependence on said control value, as one of (i) a first prefix value comprising bits each having a zero value, (ii) a second prefix value having the bit values of bits <N−1:B+W> of said corresponding second source data element, and (iii) a third prefix value having bit values corresponding to a sign extension of bits <A+W−1:A> of said corresponding first source data element.

Viewed from a further aspect, the present invention provides a data processing method for a processing apparatus for performing processing operations, the method comprising:

in response to a bitfield manipulation instruction identifying at least a first source data value comprising at least one first source data element each having N bits <N−1:0>, a second source data value comprising at least one second source data element each having N bits <N−1:0>, and a control value, generating control signals for controlling said processing apparatus to generate a result data value comprising at least one result data element each having N bits <N−1:0>, each result data element corresponding to a corresponding first source data element and a corresponding second source data element; wherein:

said control value includes information for indicating a bitfield width W, a source bit position A and a result bit position B, where 1≤W≤N, 0≤A≤N−W and 0≤B≤N−W, and each result data element comprises:

(a) bits <B+W−1:B> having bit values corresponding to bits <A+W−1:A> of said corresponding first source data element; and (b) if B+W≤N, bits <N−1:B+W> having bit values corresponding to a prefix value selected, in dependence on said control value, as one of (i) a first prefix value comprising bits each having a zero value, (ii) a second prefix value having the bit values of bits <N−1:B+W> of said corresponding second source data element, and (iii) a third prefix value having bit values corresponding to a sign extension of bits <A+W−1:A> of said corresponding first source data element.

Viewed from another aspect, the present invention provides a data processing apparatus comprising:

processing circuitry configured to perform processing operations;

an instruction decoder responsive to program instructions to generate control signals for controlling said processing circuitry to perform said processing operations;

wherein:

said program instructions include at least one instruction specifying a control value having a first portion for indicating a selected data size selected from a plurality of data sizes and a second portion for indicating at least one control parameter having a number of bits that varies in dependence on said selected data size, said first portion and said second portion each having a variable number of bits; and said instruction decoder is responsive to said at least one instruction to generate control signals for controlling said processing circuitry to perform a corresponding processing operation in dependence on said selected data size and said at least one control parameter;

wherein when processing said at least one instruction, at least one of said instruction decoder and said processing circuitry is configured to identify the number of bits comprised by said first portion of said control value and, in dependence on said number of bits comprised by said first portion, to identify (a) said selected data size, and (b) which bits of said control value form said second portion for indicating said at least one control parameter.

As mentioned above, the bitfield manipulation instruction may be associated with a selected data element size indicating the size of the data elements to be subject to the bitfield manipulation. The control parameters for controlling the bitfield manipulation operation may have variable numbers of bits depending on the data element size, and so as described above an encoding scheme using variable-length first and second portions can be used to identify these control parameters in an efficient manner.

This type of encoding of the control value may also be used for other kinds of instruction which are associated with a processing operation that is dependent on a data size selected from among a plurality of data sizes and at least one control parameter having a number of bits dependent on the selected data size. For such instructions, the instruction may specify a control value having a first portion and a second portion each having a variable number of bits. By identifying the number of bits comprised by the first portion, at least one of the instruction decoder and the processing circuitry can determine the selected data size and identify which bits of the control value correspond to the second portion representing the at least one control parameter. This form of instruction encoding can be applied to a range of types of instructions, and provides an efficient way of encoding control parameters whose number of bits varies in dependence upon the selected data size.

Note that the term "portion" need not necessarily represent a continuous portion of bits within the control value, but may also refer to any arbitrary group of bits of the control value even if those bits do not have adjacent bit positions.

In embodiments where the available instruction set includes a plurality of different kinds of instruction each using this common encoding format of the control value to identify a control parameter and data size associated with that instruction, then the instruction decoder and/or processing circuit can be made more efficient, since a part of the hardware for decoding the control value can be reused for different kinds of instructions.

This technique is particularly useful if the number of bits of the first portion increases in dependence of the selected data size as the number of bits in the second portion decreases in dependence on the selected data size. By increasing the number of bits of the first portion as the number of bits in the second portion decreases and vice versa, then the first portion can use any bits of the control value which are not required by the second portion to indicate the selected data size. Hence, the total size of the control value can remain the same regardless of the selected data size, with different bits of the control value being allocated as appropriate to either the first portion or the second portion in dependence on the particular data size being used.

In one example, the first portion of the control value may be encoded such that for at least a subset of said plurality of data sizes, said first portion comprises at least a first bit having a first state and X remaining bits having a second state, where X is a variable integer greater than, or equal to, 0; and said at least one of said instruction decoder and said processing circuitry is configured to identify the number of bits comprised by said first portion of said control value in dependence on a bit position of said first bit within a predetermined portion of said control value.

In this example, the first portion includes at least one bit having a first state (e.g. a "0" state or a "1" state). Zero, one or more remaining bits of the first portion have a second state (e.g. the other of the "0" and "1" states). In one example, the zero, one or more bits of the first portion having the second state may effectively be used as "padding" bits for filling bit positions of the control value that are not required by the second portion for indicating the at least one control parameter for a given data size. Depending on the number of the bits having the second state, the position of the bit having the first state can be varied. The data size can then be identified based on the bit position of the bit having the first state.

The technique of detecting the size of the first portion (and hence the selected data size) based on the bit position of the first bit having the first state is particularly useful since in many implementations the available data sizes will rise in powers of two, and so the bit position of the bit having the first state can often be correlated to the particular power of two used for the selected data size.

This technique of identifying the bit position of the bit of the first portion having a first state need not be the only technique used to identify the data element size. There may also at least one additional bit that provides further information for identifying the selected data size.

While it is possible to use the present control value encoding technique to represent just a single control parameter, the technique is particularly useful when there are a plurality of control parameters. In this case, then when processing the at least one instruction, the instruction decoder or processing circuitry may be configured to identify, in dependence of the number of bits comprised by the first portion, which bits of the second portion indicate each of the plurality of control parameters.

When there are a plurality of control parameters, then the present encoding technique is particularly useful if the control parameters include at least a first control parameter having a number of bits that increases as the selected data size increases and a second control parameter having a number of bits that decreases as the selected data size increases. In this case, then the second portion may include a sub-portion which indicates the first and second control parameters with bits of that sub-portion allocated to either the first control parameter or the second control parameter depending on the selected data size. Pairing a control parameter whose number of bits increases as the selected data size increases with another control parameter whose number of bits decreases as the selected data size increases results in an efficient encoding of the control value, because a bit that is not required for indicating the first control parameter for a given data size can be re-allocated for indicating the second control parameter, and vice versa.

As mentioned above, the present encoding technique may be applied to a range of different types of instruction. One type of instruction for which the technique is particularly useful is a single-instruction-multiple-data (SIMD) instruction identifying a source data value having at least one source data element. For at least one SIMD instruction, the selected data size may indicate a data element size of the at least one source data element and the corresponding processing operation may comprise performing a selected processing operation in parallel on each source data element within the source data value. A control parameter for controlling the corresponding processing operation may have different allowable ranges for different data element sizes and so the number of bits of this control parameter may vary with the data element size. Hence, the present encoding technique can be used to efficiently encode both the selected data element size and the variable length control parameter within the control value.

One particular example of a SIMD instruction, to which the present control value encoding technique may be applied, is a bitfield manipulation instruction for which said corresponding processing operation comprises generating a result data value comprising at least one result data element, each result data element corresponding to a corresponding source data element of said source data value;

each result data element comprises a result bitfield having bit values corresponding to bit values of a source bitfield of consecutive bits within said corresponding source data element; and said at least one control parameter indicates the number of bits comprised by said source bitfield and said result bitfield, a position of said source bitfield within said corresponding source data element, and a position of said result bitfield within said result data element.

Hence, the control value includes a first portion whose number of bits identifies the data element size for the bitfield manipulation instruction, and a second portion which identifies control parameters indicating the bitfield width, the position of the bitfield within the source data element and the position of the result bitfield within the result data element. The larger the data element size, the larger the possible values of the bitfield width, and the bitfield position within the source and result data elements, and hence the larger the number of bits required to indicate these parameters. Hence, the present control value encoding technique is useful for indicating these parameters.

The bitfield manipulation instruction may also specify a data element ordering parameter which identifies an order with which the result data elements are arranged within the result value. The present encoding technique using the first and second portions with variable sizes may similarly be used to identify the data element ordering parameter.

Another type of instruction to which the present encoding technique may be applied is a bitwise logical instruction which identifies a source data value and for which the corresponding processing operation comprises generating a result data value which is equivalent to the result of applying a logical operation to the source data value and a second data value determined based on the control value.

The second data value can be thought of as a mask value for combining with the source data value using a logical operation. The selected data size in this case indicates a number of bits which is comprised by a repeating pattern of bits within the second data value, and the at least one control parameter indicates information which identifies bit values of the repeating pattern of bits. Hence, in this case the selected data size is not necessarily a data element size but indicates the size of the repeating pattern of bits within the second data value. The greater the size of the repeating pattern of bits, the greater the number of bits required in the control parameter to identify bit values of those bits, and hence the control parameter will have a number of bits that varies with the selected data size. Hence, the present encoding technique is useful for indicating such parameters.

The logical operation associated with the bitwise logical instruction may include a number of different types of logical operations. For example, the logical operation may comprise one of an AND operation, an OR operation and an exclusive OR (XOR) operation.

Note that the bitwise logical instruction need not necessarily control the processing circuits to actually generate the second data value containing the repeating pattern of bits and apply a logical operation to the source data value and second data value. It is possible that the processing circuit may include hardware for generating, in a single combined operation, a result data value which is equivalent to the result that would be obtained if the second data value were generated and combined with the source data values using the logical operation. It is not necessary for the second data value to actually exist at any stage of this operation.

Viewed from a further aspect, the present invention provides a data processing apparatus comprising:

processing means for performing processing operations;

instruction decoding means for, in response to program instructions, generating control signals for controlling said processing means to perform said processing operations; wherein:

said program instructions include at least one instruction specifying a control value having a first portion for indicating a selected data size selected from a plurality of data sizes and a second portion for indicating at least one control parameter having a number of bits that varies in dependence on said selected data size, said first portion and said second portion each having a variable number of bits; and said instruction decoding means is responsive to said at least one instruction to generate control signals for controlling said processing means to perform a corresponding processing operation in dependence on said selected data size and said at least one control parameter;

wherein when processing said at least one instruction, at least one of said instruction decoding means and said processing means is configured to identify the number of bits comprised by said first portion of said control value and, in dependence on said number of bits comprised by said first portion, to identify (a) said selected data size, and (b) which bits of said control value form said second portion for indicating said at least one control parameter.

Viewed from another aspect, the present invention provides a data processing method for processing apparatus for performing processing operations in response to program instructions, comprising:

receiving at least one instruction specifying a control value having a first portion for indicating a selected data size selected from a plurality of data sizes and a second portion for indicating at least one control parameter having a number of bits that varies in dependence on said selected data size, said first portion and said second portion each having a variable number of bits;

in response to said at least one instruction, identifying the number of bits comprised by said first portion of said control value;

in dependence on said number of bits comprised by said first portion, identifying (a) said selected data size, and (b) which bits of said control value form said second portion for indicating said at least one control parameter; and controlling said processing apparatus to perform a corresponding processing operation in dependence on said selected data size and said at least one control parameter.

The present invention also provides a virtual machine provided by a computer program stored on a non-transitory computer-readable storage medium which, when executed by a computer, provides an instruction execution environment according to the data processing apparatus according to any of the examples described above. The virtual machine, for example, may model the interaction of a program containing one of the instructions described above with hardware for executing the instruction. The host computer for executing the virtual machine need not itself contain decoding and processing hardware capable of executing the instruction, but includes sufficient processing resource to be able to execute the virtual machine that simulates processing of the instruction.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 shows an example encoding of a control field within the bitfield manipulation instruction;

DESCRIPTION OF NON-LIMITING EXAMPLE EMBODIMENTS

Figure 1:
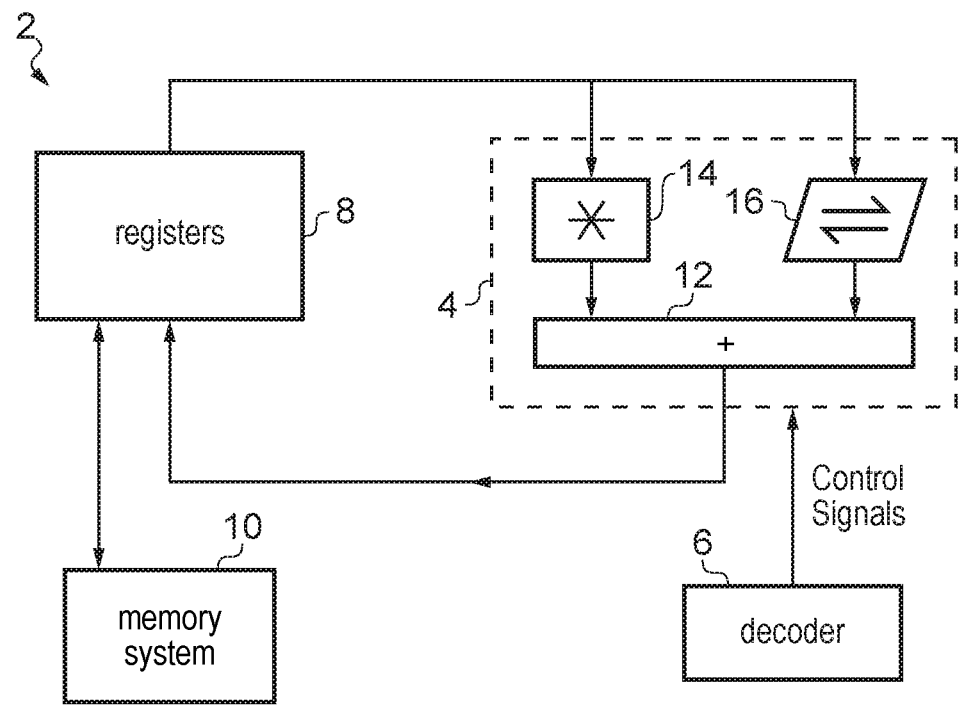
FIG. 1 schematically illustrates a data processing apparatus.

FIG. 1 schematically illustrates a data processing apparatus 2 comprising processing circuitry 4, an instruction decoder 6, a bank of registers 8 and a memory system 10. The memory system 10 includes one or more cache or memory devices. The processing circuit 4 includes a number of processing elements such as adders 12, multipliers 14 and shifters 16. When processing data, the instruction decoder 6 is responsive to program instructions to generate control signals for controlling the processing circuit 4 to process data stored in the registers 8 and to store processing results in the registers 8. Under control of the instruction decoder 6 the data processing apparatus 2 may also be controlled to transfer data between the registers 8 and the memory system 10.

The register bank 8 is accessible using multiple different register access sizes. If the registers comprise 64 bits, say, then the registers may be subject to a 64-bit access or a 32-bit access, for example. The instructions decoded by the instruction decoder 6 may include information specifying a selected register access size to be used for a given processing operation.

While in the example of FIG. 1, the processing circuit 4 is illustrated as processing data stored in the registers 8 and storing the results of data processing back to the registers 8, it will be appreciated that any other kind of storage location may be used instead of the registers 8. It will be appreciated that the data processing apparatus 2 and processing circuit 4 may typically include other elements not illustrated in FIG. 1.

Figure 2:
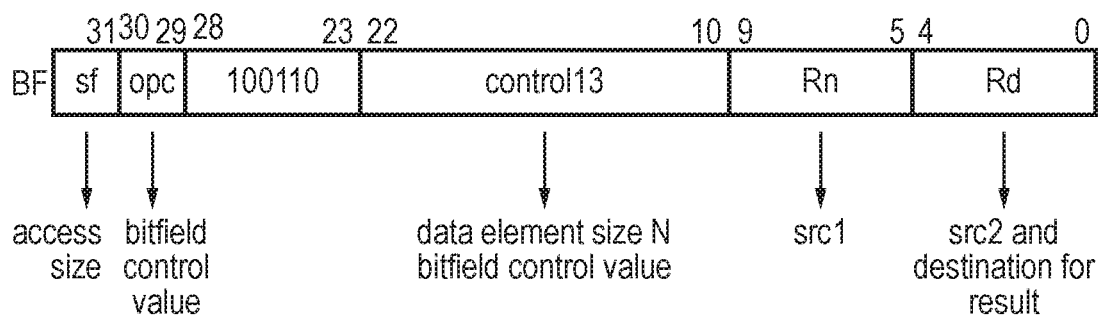
FIG. 2 shows an example encoding of a bitfield manipulation instruction.

FIG. 2 shows an example encoding of a bitfield manipulation instruction BF for controlling the processing apparatus 2 to perform a bitfield manipulation operation. The bitfield manipulation instruction is identified by an opcode located at bits <28:23> of the instruction and includes the following fields:

Rn: a source register field identifying a register of the register bank 8 that stores a first source data value src1.

Rd: a destination register field identifying a destination register of the register bank 8 into which a processing result is to be stored. The destination register field Rd also identifies a second source data value src2, which is the value stored in the destination register prior to execution of the bitfield manipulation instruction.

sf: a register access size field identifying the selected access size M to be used for the source register and destination register. In the example of FIG. 2, the register size field sf comprises a single size-indicating bit, with a first state of the size-indicating bit indicating a first access size (e.g. 64 bits) and a second state of the size field indicating a second access size (e.g. 32 bits). However, more than two different access sizes could be provided if desired by allocating more bits of the bitfield manipulation instruction encoding to the register access size field sf.

opc: a sub-opcode field which indicates a control value for controlling the type of bitfield manipulation to be performed by the processing circuit 4. An example encoding of the sub-opcode field is described below with reference to FIG. 7.

control13: a control field identifying:
  a data element size N of data elements of the first source data value src1, the second source data value src2, and a result data value to be generated during processing of the bitfield manipulation instruction; and
  a number of other control parameters for controlling aspects of the bitfield manipulation operation to be performed by the processing circuit 4.

An example of the encoding of the control13 field will be described below with reference to FIG. 5.

The number of data elements can also be derived from the sf and control13 fields. The number of data elements present within each of the first and second source data values src1, src2 and the result data value is equal to M/N, where M is the selected register access size and N is the data element size.

The sf, opc and control13 fields may collectively be considered to form a control value for controlling aspects of the bitfield manipulation operation.

While the example encoding of FIG. 2 shows the second source data value src2 being identified as the value stored in the destination register before executing the bitfield manipulation instruction, it will be appreciated that in other embodiments a separate register field may be provided to identify a register, other than the destination register, that stores the second source data value src2.

Figure 3:
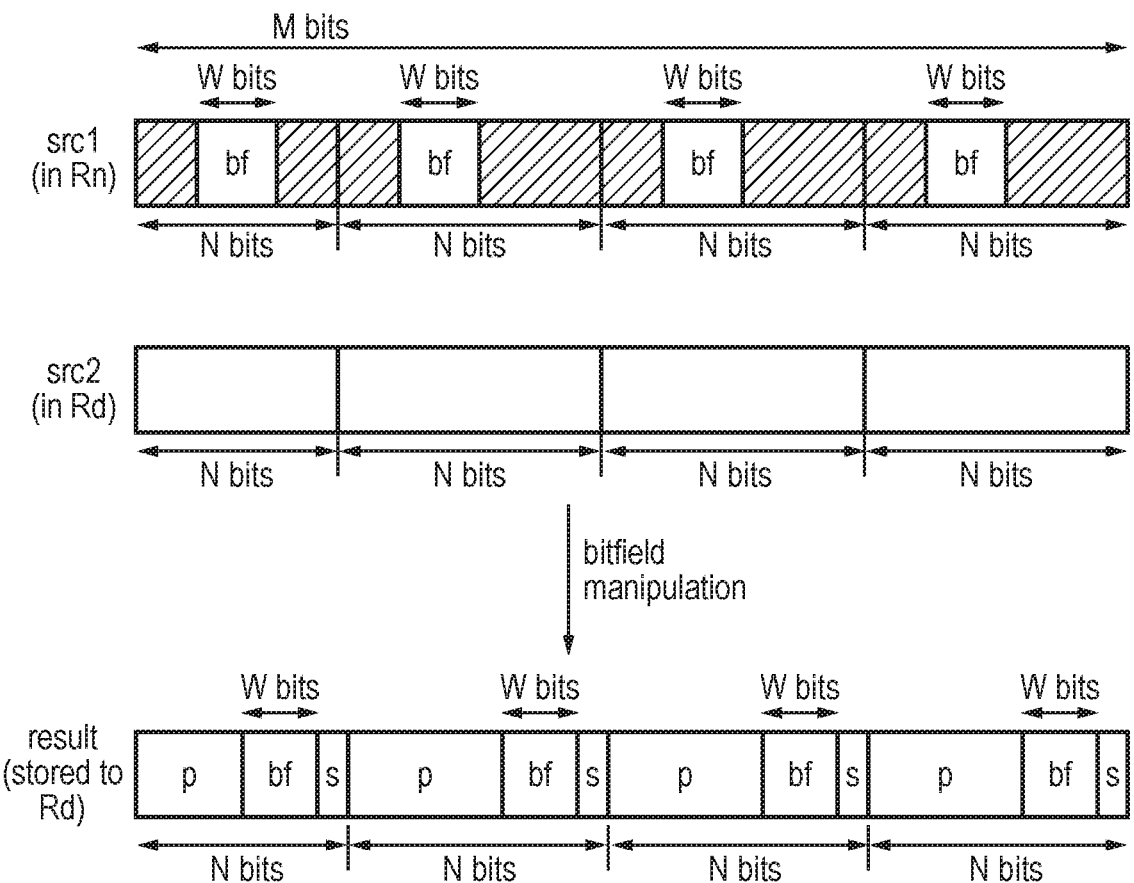
FIG. 3 shows an example of a bitfield manipulation operation.

FIG. 3 shows an example of a bitfield manipulation operation. The first source value src1, which is an M-bit value stored in register Rn prior to execution of the bitfield manipulation instruction, contains M/N data elements each having N bits. Similarly, the M-bit second source value src2 stored in the destination register Rd also includes M/N data elements each having N bits.

In response to the bitfield manipulation instruction, the processing circuit 4 generates a result data value having M/N result data elements corresponding to the data elements of the source values src1, src2. Each result data element includes W bits whose values correspond to a bitfield (bf) of W bits within the first source data value src1. The position of the bitfield within the first source data value src1 and the position of the bitfield within the result data value may be controlled based on the control value of the bitfield manipulation instruction. For each result data element, any bits that are less significant than the inserted bitfield take the value of a suffix value s while any bits of the result data element that are more significant than the bitfield take the values of a prefix value p. The result data element is stored in the destination register Rd.

Hence, the effect of the bitfield manipulation instruction is to extract a bitfield from a given position within each data element of the first source value src1, and to insert each extracted bitfield within a corresponding data element of the result value, with other bits (if any) of the destination register taking prefix and suffix values.

Figure 4:
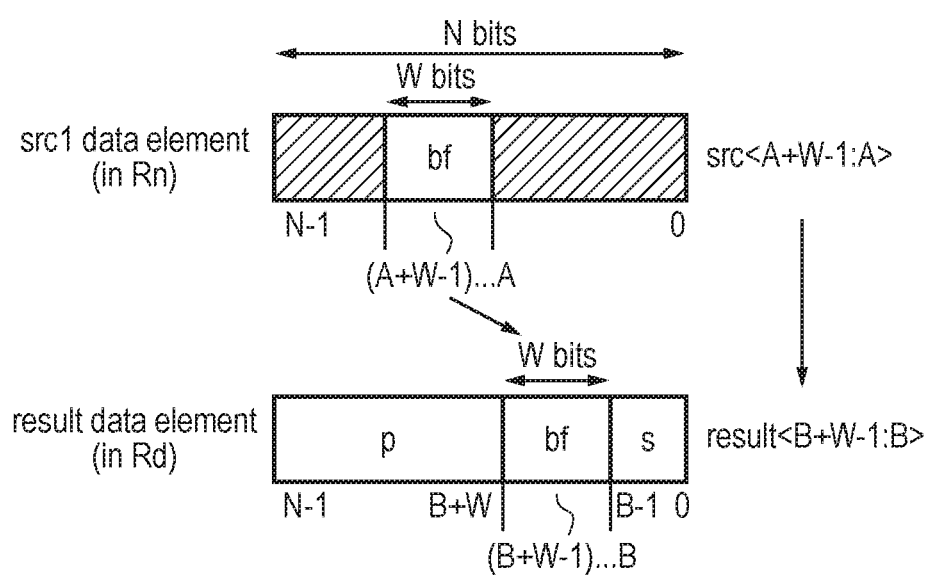
FIG. 4 shows an example of the generation of a result data element from a source data element by applying a bitfield manipulation.

FIG. 4 shows an example of the way in which the bit field manipulation operation can be defined quantitatively. FIG. 4 shows an example of the bitfield manipulation operation being applied to a single source data element in order to generate a corresponding result data element. If the source and result data values have two or more data elements, then the same operation can be applied to each source data element to generate corresponding result data elements.

The instruction decoder 6 is responsive to the bitfield manipulation instruction to generate a result data element in which bits <B+W−1:B> of the result data element take the values of a bitfield bf comprising bits <A+W−1:A> of the corresponding source data element of the first source value src1. The parameter A indicates the start bit position of the bitfield to be extracted from the first source data value src1, while the parameter B indicates the start bit position where the bit field is to be placed within the result data element. W indicates the number of bits comprised by the bitfield bf. A, B and W have any integer value within the range 1≤W≤N, 0≤A≤N−W and 0≤B≤N−W, where N is the number of bits comprised by the data element.

FIG. 4 illustrates a generic form of a bit field manipulation where the bitfield position values A and B can take the value of any bit position within the source data element and result data element respectively. It is possible to encode A, B and W directly within the control value of the bitfield manipulation instruction.

Figure 6:
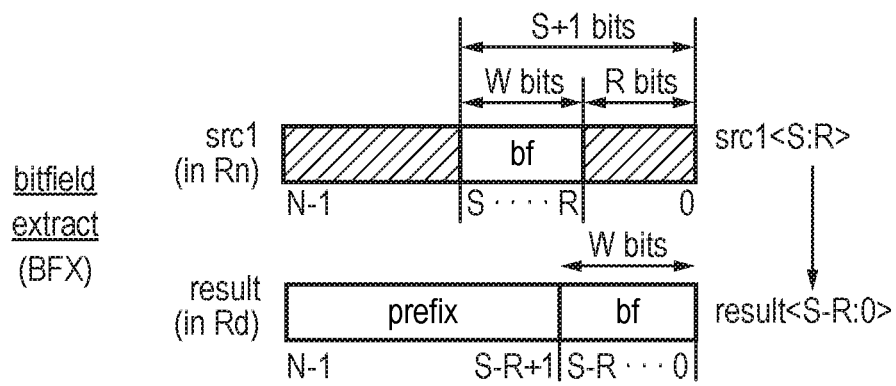
FIG. 6 illustrates an example of a bitfield insertion form of bitfield manipulation instruction and a bitfield extraction form of bitfield manipulation instruction.
Figure 6:
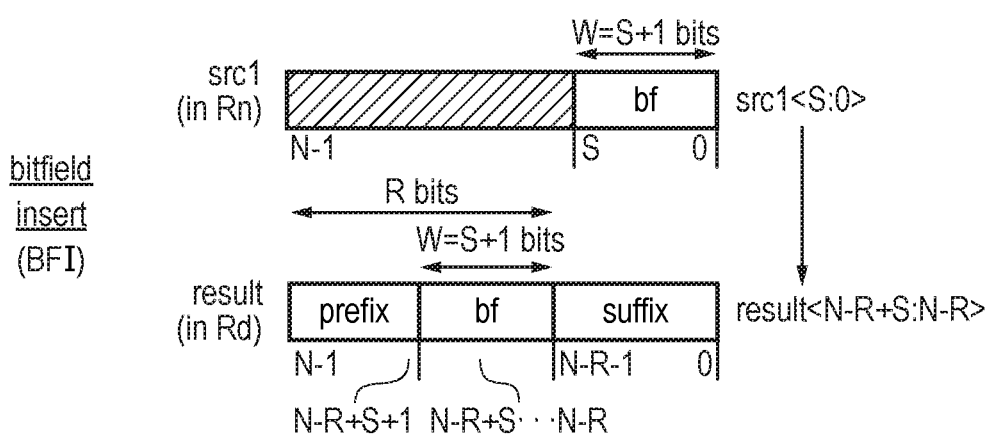

However, in a particular embodiment, a control encoding of the control13 field is used to identify A, B and W indirectly, as shown in FIGS. 5 and 6.

FIG. 5 illustrates an example encoding of the control13 field of the bitfield manipulation instruction. The control13 field has 13 bits <12:0>, including a first portion 30 and a second portion 32, each of which have a variable number of bits. The control13 field identifies a data element size N, a rotation parameter R, a most significant bit position S and reversal information V. The rotation parameter R and most significant bit position S determine the position and size of the bitfield to be extracted from the source data element src1, and the position at which the bitfield is inserted within the result data element, as shall be explained below with reference to FIG. 6. The reversal information V defines the order in which data elements are to be arranged within the result data element, as shall be explained below with reference to FIG. 7.

The first portion 30 of the control13 field comprises a variable number of bits. In this example, the first portion 30 comprises bit <12> of the control13 field, as well as zero, one or more bits of bits <5:0> of the control13 field. By detecting the number of bits comprised by the first portion 30, the data element size N can be identified.

The second portion 32 of the control13 field has a variable number of bits which represent the rotation parameter R, the most significant bit position S and the reversal information V. Which bits of the control13 field represent which parameter depends on the particular data element size N used for a given instruction. The instruction decoder 6 or the processing circuit 4 identifies which bits of the second portion 32 represent each of R, S and V based on the number of bits identified in the first portion 30.

For example, if bits <12> and <5> of the control13 field have values of 0, then this indicates that the data element size N is 32 bits. Hence, the instruction decoder 6 or processing circuit 4 can also determine that the rotation parameter R has the value of bits <10:6> of the control13 field, the size parameter has the value of bits <4:0> of the control13 field, and that the reversal information V has the binary value 0bv00000, where v is the value of bit <11> of the control13 field. Similarly, for other data element sizes, the parameters N, R, S and V can be determined from the control13 field in the way shown in FIG. 5.

The control13 field includes a sub-portion (bits <11:6>) which represents the R and V parameters. The greater the data element size N, the greater the number of bits required for the rotation parameter R, and the fewer the number of bits required for the reversal information V. Hence, bits <11:6> of the control13 field are shared between these parameters in the way shown in FIG. 5. For different data element sizes N, bits of the sub-portion are allocated to indicate either the rotation parameter R or the reversal information V. In a similar way the first portion 30 and the part of the second portion 32 indicating the most significant bit position S can share a fixed number of bits since the number of bits used for each of these values varies in opposite directions as the data element size N increases or decreases. Since for any given data element size, bits that are not required for one parameter are used to indicate another parameter, then there are no left over bits that do not indicate any parameter for some values of the data element size, and so the encoding of the control13 field efficiently represents the N, R, S and V parameters.

The interpretation of the control13 field will be described in more detail below with reference to FIG. 10.

FIG. 6 shows an example of a bitfield manipulation operation performed in dependence on the bit field position parameter R and the most significant bit position S. The source bitfield start position A, the result bitfield start position B and the bitfield width W can all be derived from the parameters S and R.

The bitfield manipulation operation has two alternative forms depending on the relation between parameters S and R. In response to a bitfield extraction form BFX of the instruction, the processing circuit 4 is controlled to extract a bitfield bf located at a selected position within the first source data element src1 and write the bitfield to the least significant portion of the corresponding result data element. In response to a bitfield insertion form BFI of the instruction, the processing circuit 4 is controlled to copy a bitfield located at the least significant portion of the first source data element src1 and insert the copied bitfield at a selected position within the corresponding result data element.

As shown in the upper part of FIG. 6, if S≥R, then the bitfield manipulation instruction is of the bitfield extraction form BFX. For the bitfield extraction form of the instruction, the rotation parameter R indicates the position of the least significant bit of the bitfield bf within the first source data element src1, and the most significant bit position S indicates the position of the most significant bit of the bitfield bf within the first source data element src. Hence, the source bitfield start position A equals the rotation parameter R, the result bitfield start position B is zero, and the bitfield width W=S+1−R. This means that in response to the bitfield extraction form BFX of the instruction, bits <S−R:0> of the result data element are set equal to bits <S:R> of the corresponding first source data element src1.

On the other hand, if S<R, then the bitfield manipulation instruction takes the bitfield insertion form BFI, as shown in the lower part of FIG. 6. In this case, then the source bitfield start position A equals zero, the result bitfield start position B=N−R and the bitfield width W=S+1. Hence, in the bitfield insertion form of the instruction, bits <N−R+S:N−R> of the result data element are set equal to bits <S:0> of the first source data element src1.

By constraining at least one of the source start bit position A and the result start bit position B to equal to zero, then the encoding of FIG. 5 becomes efficient since just two parameters R, S can encode the three parameters A, B, W for identifying the bitfield manipulation to be performed. If a more generic bitfield manipulation operation is desired in which a bitfield from a non-zero source start bit position A is to be written to a non-zero result bit position B (as in the example shown in FIG. 4) then this can be implemented by executing a bitfield extraction form BFX of the instruction followed by a bitfield insertion form BFI of the instruction.

Figure 7:
FIG. 7 shows an example of selecting different prefix and suffix portions of the result data element in dependence on a control value within the bitfield manipulation instruction.

FIG. 6 shows that in the bitfield extraction form BFX of the bitfield manipulation instruction, the bitfield bf is written to the least significant portion of the result data element, and so the result data element may include a prefix portion, but not a suffix portion. For some values of R and S there may also be no prefix portion. In contrast, for the bit field insertion form BFI of the instruction the bitfield may be inserted at any portion of the result data element, and so the result data value may have both a prefix portion and the suffix portion (the values of R and S will control whether the result data element includes none, one or both of the prefix portion and suffix portion). In general, the result data element will include a prefix portion (bits <N−1:B+W>) if B+W≤N, and will include a suffix portion (bits <B−1:0>) if B>0. As described above, the bitfield manipulation instruction includes a sub-opcode field opc. The opc field controls the processing circuit 4 to generate a selected form of prefix or suffix value. FIG. 7 illustrates different kinds of prefix and suffix value which may be selected for different values of the opc field.

When the sub-opcode field opc has a value of 0b00 then the prefix portion p is a sign extension of the bitfield bf, and bits of the suffix portion s have a zero value. The sign extension bits have values that ensure that the sign of the bitfield bf is preserved when inserted within the result data element. Typically, the sign extension bits of the prefix portion are each equal to the value of the most significant bit of the bitfield bf (i.e. each equal to bit <S> of the first source data element). However, the exact nature of the sign extension bits within the prefix portion p will depend on the particular sign representation used for the bitfield bf. By setting the sub-opcode field to 0b00, the bitfield manipulation instruction can be used to extract from the first source data element a bitfield comprising a signed data value, and copy this value to part of the result data element while preserving the sign of the bitfield.

When the sub-opcode field has a value of 0b01 then the prefix and suffix portions of the result data element take the values of corresponding bits of the second source data element src2. Hence, this form of instruction has the effect of inserting a bitfield bf from the first source data element src1 into a position within the second source data element src2 while leaving other bits of the second source data element src2 unchanged. In the example shown in FIG. 2, the second source data element src2 is the value stored in the destination register Rd prior to execution of the bitfield manipulation instruction, and so for opc=01, the instruction effectively inserts a bitfield of the first source data element src1 into a given position of the destination register Rd while leaving other bits unchanged.

If the sub-opcode field has a value of 0b10, then the bits of the prefix and suffix portions each have zero values. Hence, for this kind of instruction a bitfield of the first source data element src1 is isolated and surrounded by zeros in the result data element.

In the example of FIG. 7, a value of 0b11 for the sub-opcode field opc is undefined, but it will be appreciated that other functionalities could be associated with the 0b11 value.

Figure 8A:
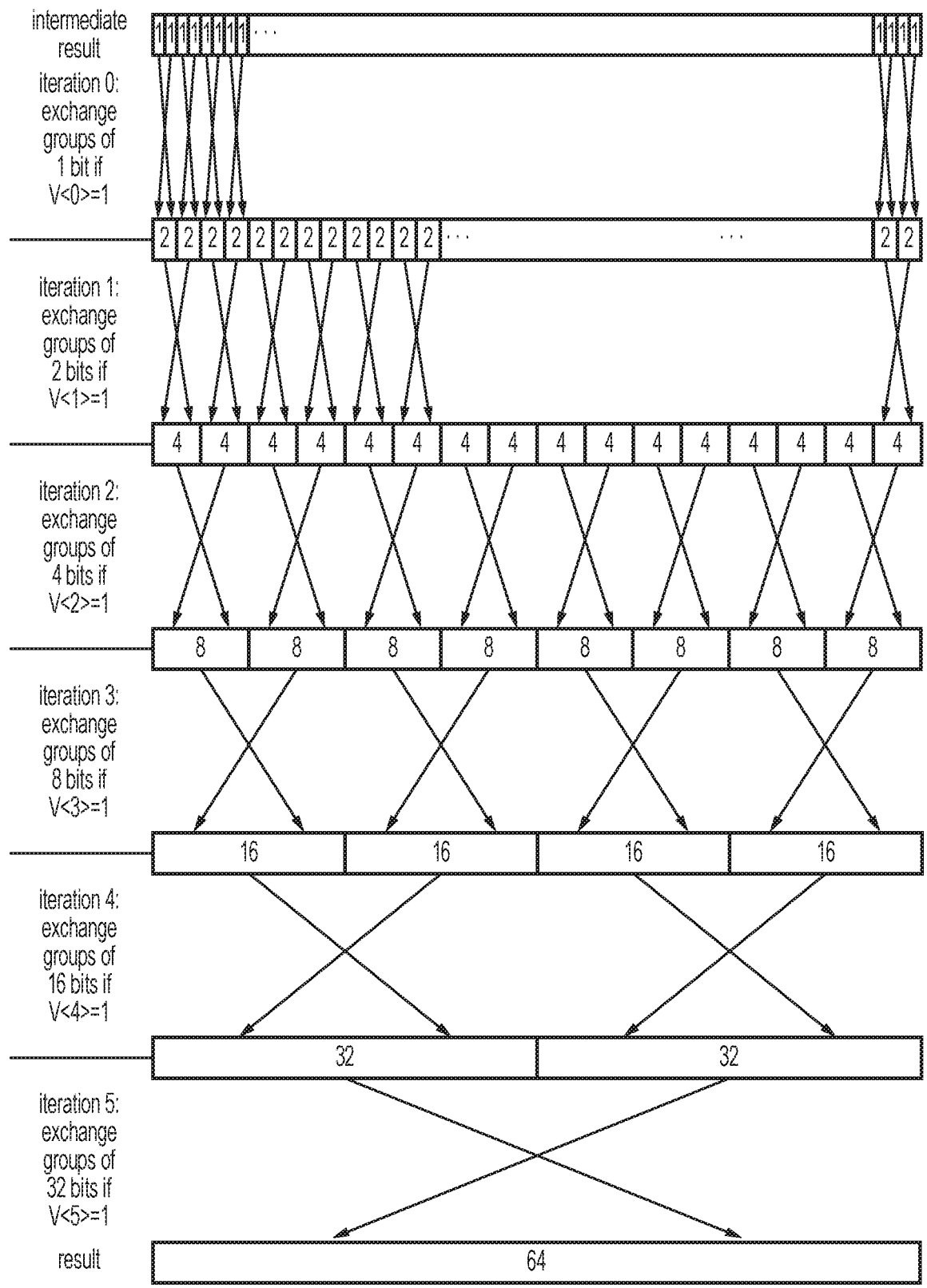
FIG. 8A illustrates an example of reordering data elements within the result data value in dependence on reordering information encoded within the control value.

As mentioned above, the control13 field indicates reversal information V for controlling the ordering of data elements within the result data value. FIG. 8A schematically illustrates an example of re-ordering data elements in dependence on the reversal information V. The result data value is equivalent to the value that would be generated if an intermediate result data value, generated using the bitfield manipulation as described above and including the data elements in an order corresponding to the order of corresponding data elements within the first and second source data values, was subject to a series of re-ordering iterations controlled in dependence on the reversal information V. Each reordering iteration is associated with a particular group size indicating the granularity with which groups of bits are to be reordered within the data value, and is also associated with a corresponding bit of the reversal information V. Each reordering iteration comprises determining whether the corresponding bit of the reversal information V has a predetermined value, and if the corresponding bit has the predetermined value, then exchanging within the result data value the positions of adjacent pairs of groups of bits of the corresponding group size. In the examples described below, a "1" value is used as the predetermined value of the reversal information V, but a "0" value could be used instead.

FIG. 8A shows an example of a series of reordering iterations that may be applied to the intermediate result to generate a result data value. In reordering iteration 0, the positions of pairs of adjacent bits of the intermediate result are exchanged if bit V<0> of the reversal information V<5:0> has a value of 1. That is, bit <0> of the intermediate result is swapped with bit <1>, and similarly bits <3> and <2> are swapped, bits <5> and <4> are swapped, and so on. On the other hand, if bit V<0> has a value of 0, then the swapping is not performed.

In a similar way, for reordering iteration 1 shown in FIG. 8A, the positions of adjacent groups of 2 bits within the result of the previous iteration are exchanged if the corresponding bit V<1> of the reversal information V has a value of 1. Hence, bits <1:0> are swapped with bits <3:2>, bits <7:6> are swapped with bits <5:4>, and so on. Otherwise, if V<1>=0, then the bits of the result of the previous iteration remain the same.

Similarly, for each successive reordering iteration, adjacent pairs of groups of bits are exchanged in position if a corresponding bit of the reversal information V has the value 1, with the group sizes for each reordering iteration ascending in powers of 2. The operation shown in FIG. 8A can be summarised, for example, as a series of reordering iterations where the $i^{th}$ reordering iteration exchanges the positions of pairs of adjacent groups of $2_i$ bits if the corresponding bit V<i> of the reversal information has a value of 1, and does not exchange the positions of the pairs of groups of 2i bits if the corresponding bit V<i> has a value of 0. While it is convenient to use bit <i> of the reversal information V to indicate whether or not the $i^{th}$ reordering iteration should exchange the positions of groups of bits, a different correspondence between the bits of the reversal information V and the reordering iterations could also be used. The total number of reordering iterations depends on how many data elements are present. For example, the iteration 5 shown in FIG. 8A would not be performed in the case of a 32-bit data value because there would be only a single group of 32 bits and so it would not be possible to swap a pair of 32-bit groups.

FIG. 8A shows an example where groups of bits having numbers of bits 1, 2, 4, etc. can be exchanged in position. In some examples, the bitfield manipulation instruction may be encoded such that only groups of bits that correspond to a multiple of the data element size can be exchanged in position. Such an example is shown in FIG. 8B.

Figure 8B:
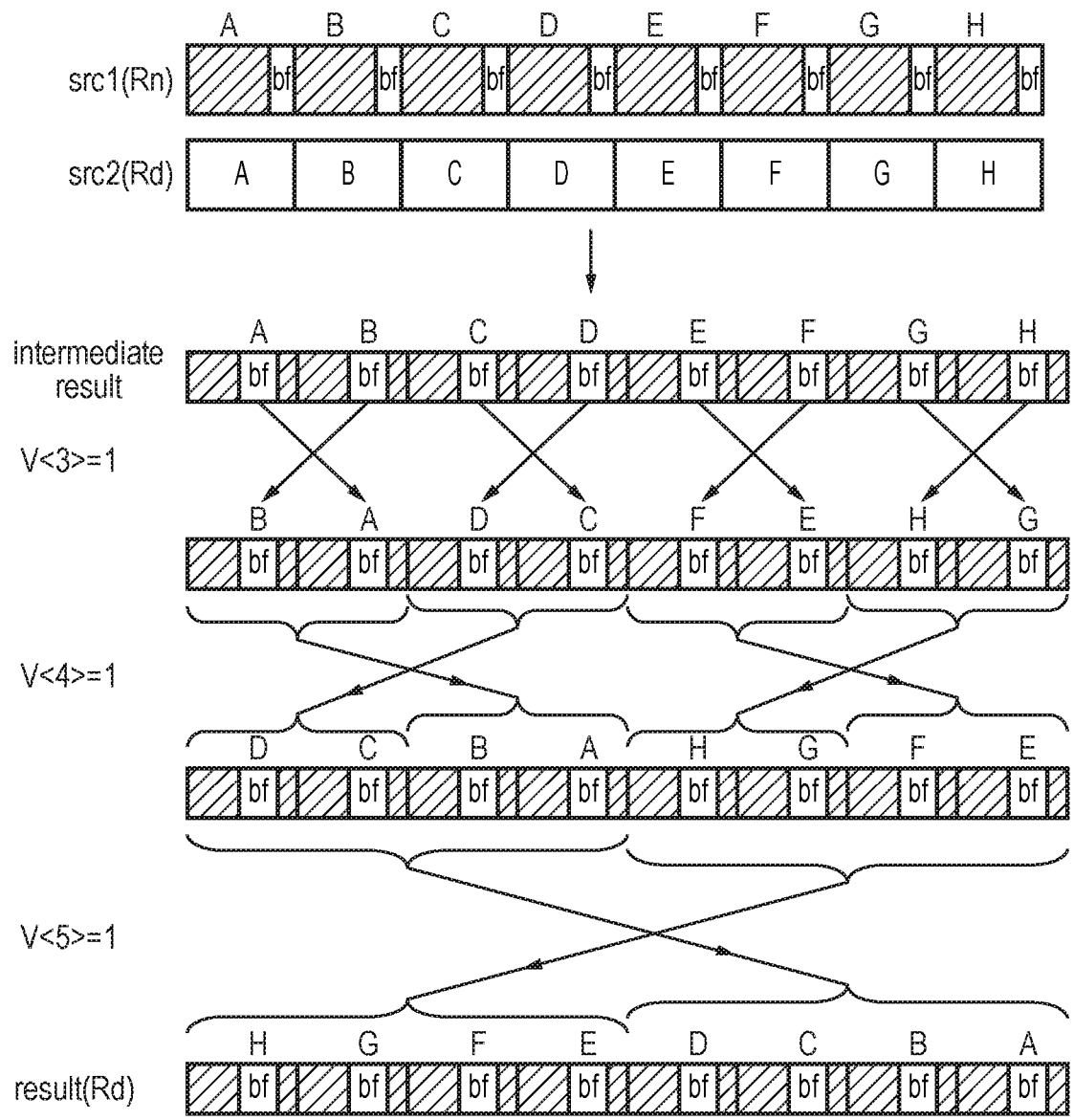
FIG. 8B illustrates a second example of reordering data elements.

FIG. 8B shows an example where a 64-bit data value comprises eight 8-bit data elements A-H. In the example shown in FIG. 5, the control13 field is encoded such that a zero value is placed into any bit of the reversal information V<5:0> that corresponds to a reordering iteration for swapping groups of bits that are smaller than the data element size N. Hence, the control13 field only indicates values of bits of the reversal information V that indicate a swapping of groups of bits that are equal to, or greater than, the data element size N. For example, for a data element size of 8 bits as shown in FIG. 8B, then bits V<2:0> of the reversal information are set to 0, to indicate that reordering iterations 0, 1 and 2 for swapping groups of 1, 2 and 4 bits as shown in FIG. 8A should not be performed. Bits <5:3> of the reversal information V are encoded within the control13 field to indicate whether reordering iterations 3, 4 and 5 should be performed to exchange the positions of neighbouring groups of 8, 16 and 32 bits.

FIG. 8B shows how the first and second source data values src1, src2 initially include data elements A-H having a particular storage order as indicated by the letters A to H. If no data element reordering is performed then application of a bitfield manipulation instruction to the source data value would yield a result data value in which the result data elements are ordered in the order A, B, C, . . . , H corresponding to the order of the data elements within the source data values (see the intermediate result illustrated in FIG. 8B).

However, under control of the reversal information V, the instruction decoder 6 can control the processing circuit 4 to apply data element reordering when generating the final result data value. As bits <2:0> of the reversal information V have a value of 0, then the first reordering iteration which may be performed is associated with bit V<3>. FIG. 8B shows that if bit V<3> has a value of 1, then adjacent groups of 8 bits (i.e adjacent data elements) are exchanged in position, while otherwise the intermediate value is unchanged. Then, another reordering iteration exchanges the positions of adjacent groups of 16 bits (i.e adjacent groups of two data elements) if bit V<4> has a value of 1. A further reordering iteration then swaps adjacent groups of 32 bits (i.e. adjacent groups of four data elements) if bit V<5> has a value of 1. By selectively exchanging, or not exchanging, differently sized groups of bits in dependence on the bits of the reversal information V, different orders of data elements can be provided within the result data value. For example, the table at the bottom of FIG. 8B shows different data element orderings which result from the reordering iterations shown in FIG. 8B for different values of the reordering information V<5:3>. Hence, it can be seen that by applying successive reordering iterations, each iteration exchanging the positions of adjacent pairs of differently sized groups of bits, then a range of data element orderings can be produced within the result value.

Note that it is not necessary for the data processing circuit 4 to actually generate the intermediate result using the bitfield manipulation operation, and to then apply the series of reordering iterations to the intermediate result in order to generate the result data value. The data processing circuit 4 may be configured to apply the bitfield manipulation at the same time as reordering the data elements, so that a result data value is generated in which a bitfield of the source data element is included within each result data element, and the result data elements are ordered in the order corresponding to the reversal information V, without any intermediate result ever having been produced. The result data value may merely be a value that is equivalent to the result that would be obtained if the reordering iterations were applied to such an intermediate result.

Figure 9:
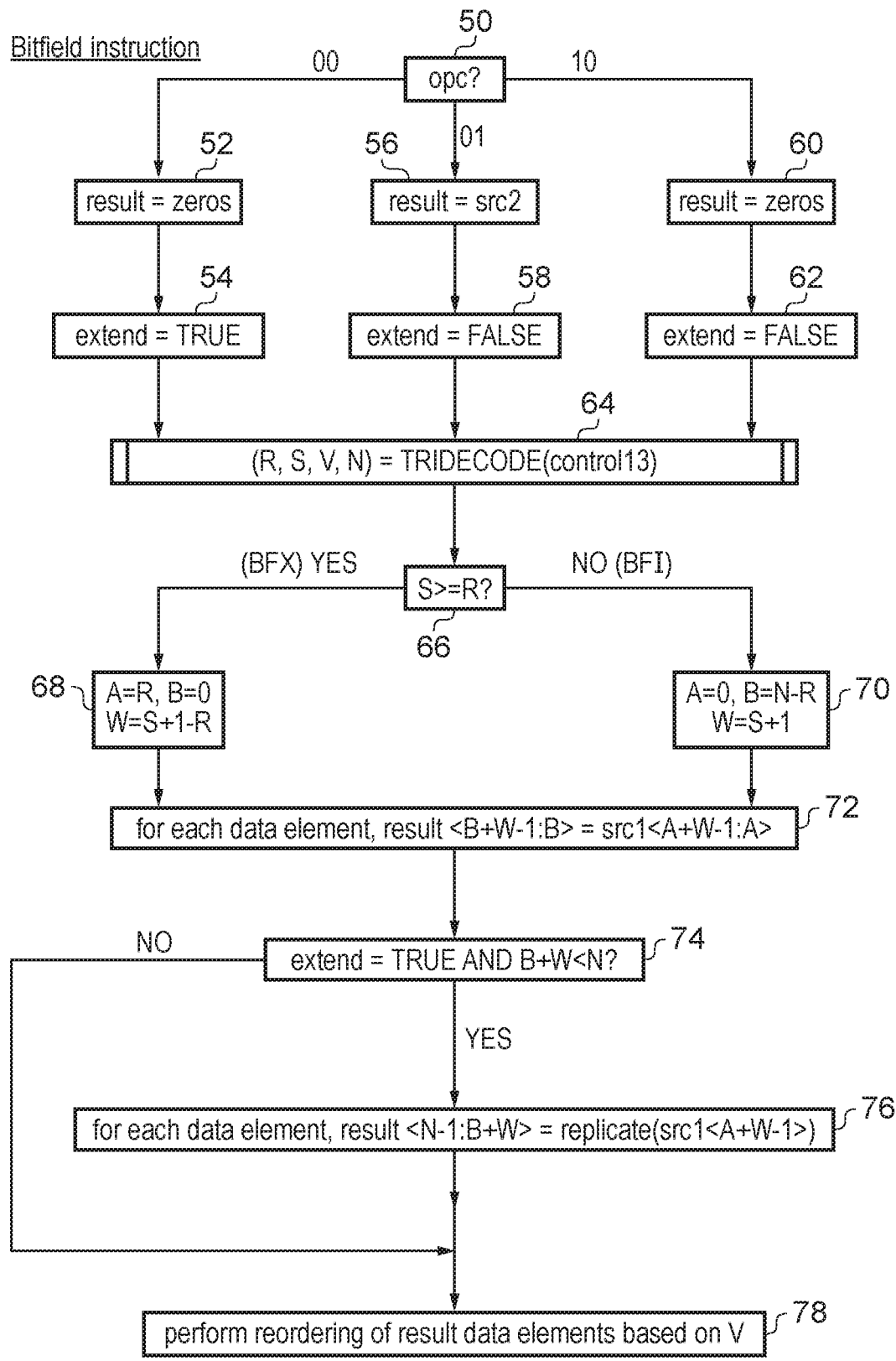
FIG. 9 illustrates a method of processing a bitfield manipulation instruction.

FIG. 9 shows an example of processing a bitfield manipulation instruction encoded as in the example of FIG. 2. Note that while FIG. 9 illustrates a flowchart showing a series of method steps, in reality the hardware for implementing the instruction may perform several of these steps in parallel with one another or may perform other steps that yield a similar result (the same is true for other flowcharts shown in the present application).

At step 50, the instruction decoder 6 checks the value of the sub-opcode field opc. If the sub-opcode field opc has a value of 0b00 then the method proceeds to step 52 where the result data value is initialised to a zero value. Then, a Boolean quantity extend is set to a TRUE value at step 54 (indicating that when applying the bitfield manipulation the prefix value is to be set to a sign extension of the extracted bitfield).

On the other hand, if at step 50 the sub-opcode field is opc determined to have a value of 0b01, then at step 56 the result data value is initialised to the value of the second source data value src2 (so that each result data element will have prefix and/or suffix portions having bit values corresponding to those of the corresponding data element of the second source data value src2). Then at step 58, the Boolean quantity extend is set to a FALSE value indicating that no sign extension is to be performed when generating the prefix portion.

Alternatively, if at step 50 the sub-opcode field opc is found to have a value of 0b10, then at step 60 the result value is set to a zero value, and at step 62 the Boolean value extend is set to a FALSE value. Hence, when each result data element is generated, any bits other than the inserted bitfield will have a zero value and no sign extension of the bitfield will be performed.

Regardless of the value of the sub-opcode field opc at step 50, then the method proceeds to step 64 where a function TRIDECODE(control13) is performed to decode the control field control13 of the bitfield manipulation instruction in order to identify the rotation parameter R, the most significant bit position S, the reversal information V and the data element size N. The TRIDECODE function will be described below with respect to FIG. 10.

Having identified the values of R, S, V and N at step 64, then at step 66, it is determined whether or not the most significant bit position S is greater than or equal to the rotation parameter R. If S is greater than or equal to R, then at step 68 the source bitfield position value A is set equal to R, the result bitfield position value B is set to 0 and the bitfield width W is set equal to S+1−R (i.e. the bitfield manipulation is of the bitfield extraction form BFX). On the other hand, if at step 66 it is determined that S is less than R, then the instruction has the bitfield insertion form BFI and so at step 70 the source bitfield position value A is set to 0, the result bitfield position value B is set to N−R and the bitfield width W is set to S+1.

At step 72, then regardless of whether the instruction has the bitfield insertion form BFI or the bitfield extraction form BFX, then the processing circuit 4 generates a result data value in which each data element has bits <B+W−1:B> equal to bits <A+W−1:A> of the corresponding first source data element src1. This step ensures that the target bitfield of the first source data element is copied to the desired position within the result data element. The remaining bits of the result data element continue to have the values as initialised at one of steps 52, 56 and 60.

Then at step 74 it is determined whether or not the Boolean quantity extend is TRUE and B+W≤N. If extend is TRUE and B+W≤N then this indicates that there is a prefix portion <N−1:B+W> within the result data element and that the sub-opcode field opc indicated that a sign extension was to be applied to the bitfield. In this case, at step 76 the processing circuit 4 sets bits <N−1:B+W> of each result data element to the value of the sign bit within the bitfield copied from the source data element src1 (i.e. bit <S> of the first source data element is replicated at each bit of the prefix portion within the result data element). This has the effect of preserving the sign of the bitfield extracted from the first source data element src1. On the other hand, if at step 74 the Boolean quantity extend is FALSE, then step 76 is omitted and so the prefix portion of the result data element will retain its previous value (either a zero value as set at step 60 or a previous value of the second source data element src2 as set at step 56). If B+W=N, then step 76 is also omitted as in this case there will be no prefix portion.

At step 78, a reordering of result data elements within the result data value is applied based on the reversal information V identified from the control13 field of the bitfield manipulation instruction, for example as described above with reference to FIGS. 8A and 8B. Note that in some hardware implementations, this step may be performed in parallel with the generation of the result data elements at step 72.

Hence, under control of the bitfield manipulation instruction a result data value is generated in which each result data element includes a bitfield taken from a desired position <A+W−1:A> within the corresponding first source data element src1; in which prefix and suffix portions bounding the bitfield within the result data element are set to zero values, a sign extension value or a value of the second source data element src2 as desired; and in which, optionally, a reordering of result data elements within the result is also performed. Hence, the bitfield manipulation instruction provides a great range of bit field manipulations within a common encoding.

Moreover, the bitfield manipulation instruction can also be used as a data element reordering instruction, by setting the parameters S and R to appropriate values so that the bitfield corresponds to the entire first source data element src1. In this case, the result data elements are the same as the corresponding first source data elements, but are reordered within the result data value according to the reversal information V.

Figure 10:
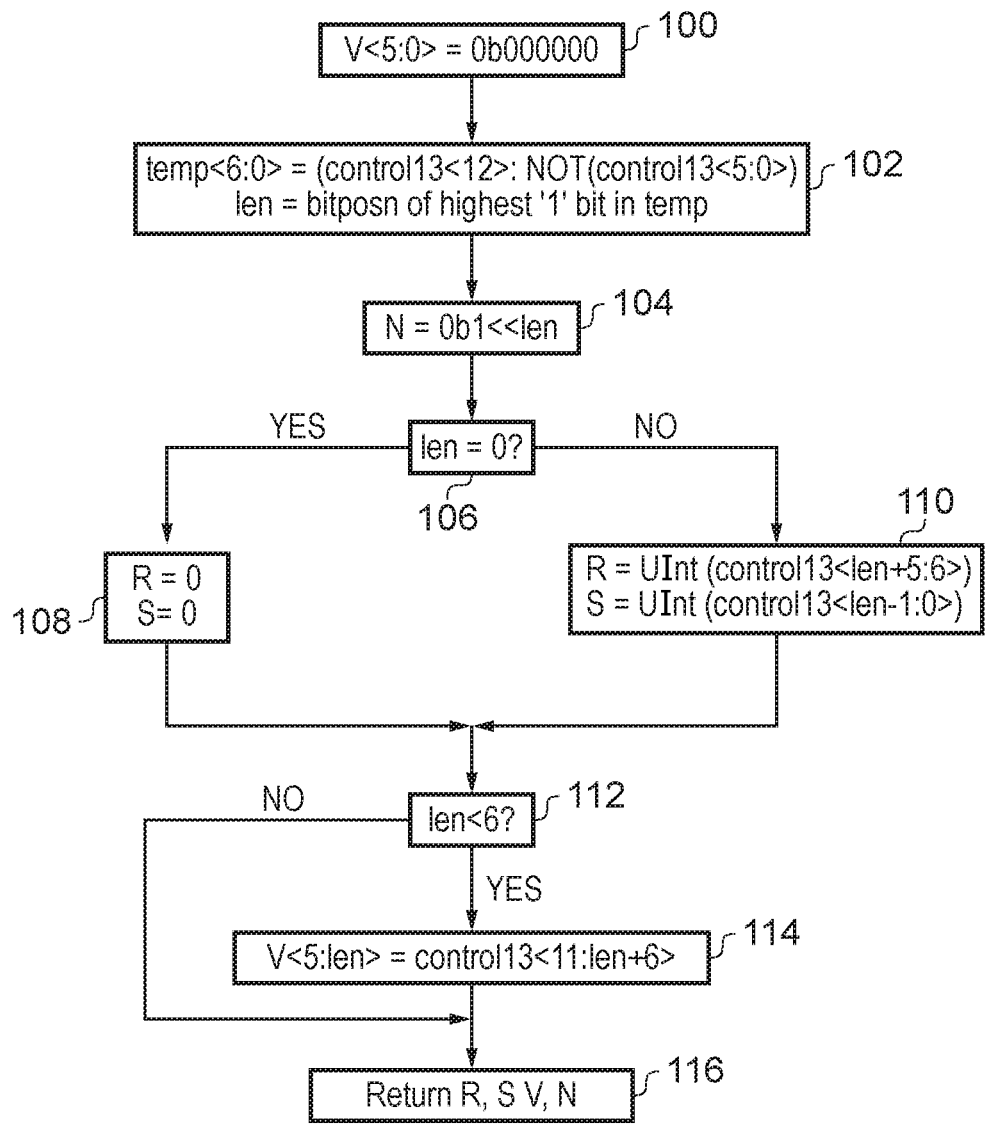
FIG. 10 illustrates a method of decoding a control field to obtain the values of control parameters.

FIG. 10 illustrates an example of the decoding of the control13 field using the TRIDECODE function, as shown at step 64 of FIG. 9 (and, as will be described below, at step 160 of FIG. 15). The decoding of the control13 field may be performed by the instruction decoder 6, the processing circuit 4, or by the instruction decoder 6 and processing circuit 4 in combination. As shall be described below, the control13 field may be used for different kinds of instructions. The "data size" referred to with reference to FIG. 10 corresponds to the data element size N of the bitfield manipulation instruction described with reference to FIGS. 2-9, and to the pattern repetition size N of the bitwise logical instruction described with reference to FIGS. 11-15.

At step 100 of FIG. 10, the parameter V<5:0> is initialised to an all-zero value of 0b000000. This ensures that any values of the reversal information V that are not encoded within the control13 field will take zero values and so will ensure that the corresponding reordering iterations will not be performed.

At step 102, a temporary value temp<6:0> is determined by concatenating bit <12> of the control13 field with the inverse of bits <5:0> of the control13 field, and a length parameter len is determined as the bit position of the highest (most significant) bit having a "1" value within temp<6:0>. The value temp <6:0> represents the bit values of the portion of the control13 field within which the first portion 30 could reside. If the data size is 64 bits, then the most significant bit having a "1" value will be bit <6> of temp<6:0> and so len=6. For other data sizes, the highest "1" bit within temp<6:0> will correspond to the position of the highest "0" within bits <5:0> of the control13 field, and so len=5, 4, 3, 2, 1, 0 for N=32, 16, 8, 4, 2, 1 respectively (see FIGS. 5 and 12). Thus, the length parameter len is an indication of the size of the first portion 30, which allows the data size N and encoding format of the R, S and V parameters to be determined at steps 104-114 of FIG. 10. It will be appreciated that is not essential for the temporary value temp to be generated during decoding of the control13 field, and in some embodiments a single operation may determine the len parameter directly from the value of the control13 field.

Figures 11, 12:
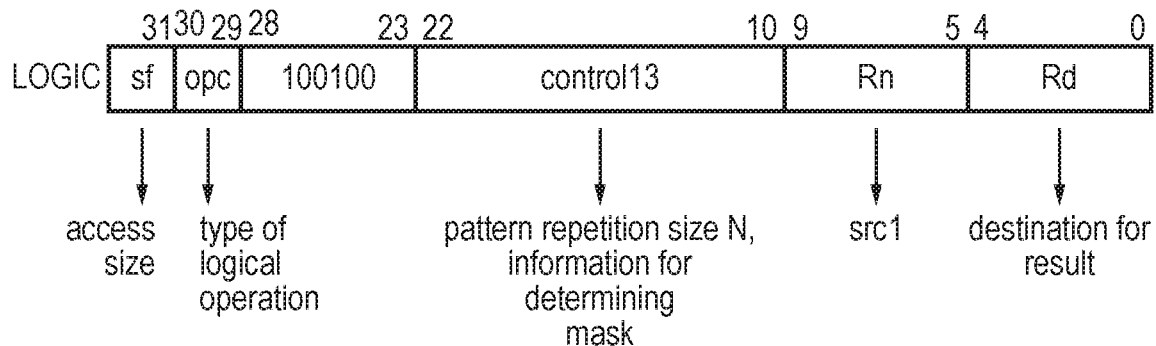
FIG. 11 illustrates an example encoding of a bitwise logical instruction that shares a common control field encoding with the bitfield manipulation instruction.
FIG. 12 illustrates an example encoding of the control field of the bitwise logical instruction.

At step 104 of FIG. 10, the data size N is determined by shifting a value 0b1 left by len bit positions. For example, if len=2, then shifting the value of 0b1 left by 2 results in a value 0b100, i.e. a data size N of four bits. Hence, the data size N is equivalent to $2^{len}$. In this way, the size of the first portion 30 of the control13 field can be correlated to the corresponding data size N as shown in FIGS. 5 and 12.

At step 106 of FIG. 10, it is determined whether or not the length parameter len is equal to 0. If len=0, then at step 108, the rotation parameter R and most significant bit position S are set to 0. This corresponds to the data element size of 1 bit, for which there is only one possible bitfield manipulation that may be applied: copying the single bit of each first source data element src1 to the single bit of the corresponding result data element src2, and so for N=1 there is no need for any rotation and most significant bit position parameters R, S (note that the encoding of the control13 field in this case uses the bits that would otherwise be used to indicate R, S to instead indicate the reversal information V and the first portion 30).

If at step 106 the length parameter len does not equal zero, then at step 110, the rotation parameter R is set to an unsigned integer having the values of bits <len+5:6> of the control13 field, while the most significant bit position S is set to an unsigned integer having the values of bits <len−1:0> of the control13 field. This corresponds to the encoding of the control13 field as shown in FIGS. 5 and 12.

At step 112 it is determined whether the length parameter is less than 6. If so, then at step 114, bits <5:len> of the reversal information V are set equal to bits <11:len+6> of the control13 field. Bits <len−1:0> of the reversal information retain their zero values as initialised at step 100 of FIG. 10. Again, this corresponds to the encoding of the control13 field as shown in FIG. 5.

On the other hand, if at step 112 len=6 then the data size is 64 bits, which for the example of FIG. 5 is the maximum data element size, corresponding to the size of an entire 64-bit data value. If len=6, then there cannot be any reordering of data elements because there is only one way of ordering a single data element within a data value. Hence, step 114 of FIG. 10 is omitted if len=6, causing the reordering information V to continue to equal 0 as set at step 100.

Finally, at step 116, the determined values of the parameters R, S, V and N are returned for use by the processing circuit 4 when processing the instruction containing the control13 field.

The encoding of the control13 field as shown in FIG. 5 can be used for other types of instructions as well as bitfield manipulation instructions. The encoding of the control13 field is useful for any kind of instruction which specifies a selected one of a group of data sizes and at least one control parameter whose number of bits varies in dependence on the selected data size. The bitfield manipulation instruction is an example of a SIMD instruction. The control13 encoding may similarly be used for another instruction which specifies a data element size and at least one other parameter whose number of bits varies in dependence on the data element size.

FIG. 11 shows a bitwise logical instruction LOGIC, which is another example of an instruction which uses the control13 encoding. The control13 field of the bitwise logical instruction is encoded as shown in FIG. 12. A comparison of FIGS. 5 and 12 shows that the R and S parameters are identified in the same way for the bitwise logical instruction LOGIC as for the bitfield manipulation instruction BF, and that a pattern repetition size N is identified for the bitwise logical instruction in the same way as the data element size N is identified for the bitfield manipulation instruction in FIG. 5. The bitwise logical instruction has no equivalent to the reversal information V and so the bits of the control13 field that represent the reversal information V for the bitfield manipulation instruction BF are unused in the encoding of the control13 field for the bitwise logical instruction LOGIC. It will be appreciated that in other embodiments, the unused bits shown as x in FIG. 12 could indicate another parameter.

Figures 13, 14:
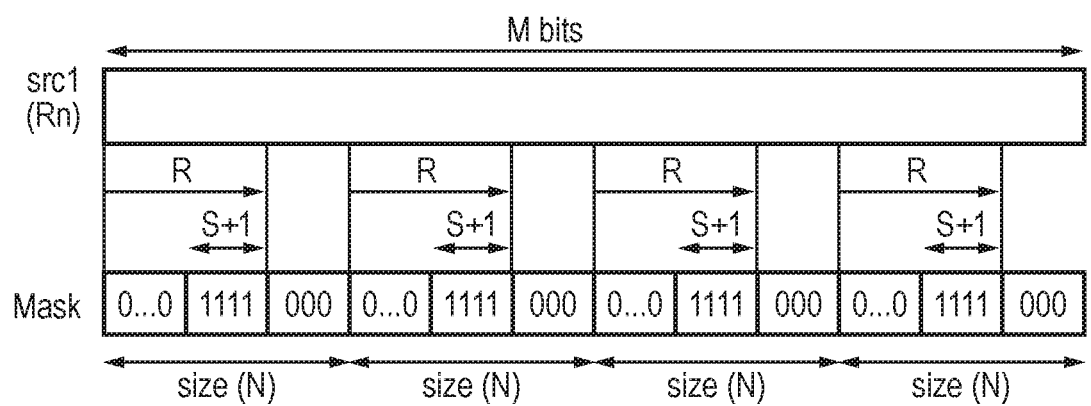
FIG. 13 illustrates an example of a mask value for combining with a source data value using a logical operation.
FIG. 14 illustrates different kinds of logical operations that may be performed under control of the bitwise logical instruction.

FIGS. 13 and 14 illustrate the function of the bitwise logical instruction LOGIC. The instruction identifies a source register Rn which stores a first source data value src1. The sub-opcode field opc of the bitwise logical instruction indicates a type of logical operation to be applied to the first source data value src1 and a mask data value. For example, the logical operation may be one of an AND operation, an OR operation, or an exclusive OR (XOR) operation, as shown in FIG. 14.

The instruction decoder 6 responds to the logical instruction by generating control signals for controlling the processing circuit 4 to generate a result value by combining the source data value src1 with the mask data value (mask) using the selected logical operation. The mask data value is a value determined using the selected data size N and the parameters R and S as identified from the control13 field of the logical instruction.

The mask data value comprises a repeating pattern of bits. The unit of repetition of the repeating pattern is the selected data size N identified by the control13 parameter. Each repeating pattern consists of N bits of which S+1 bits have a "1" value and the other bits have a "0" value. The repeating pattern is equivalent to a value that would result if (S+1) bits each having a 1 value were located at the least significant end of the pattern (with more significant bits having a "0" value), and the pattern was then rotated to the right by R bit positions. It will be appreciated that in other embodiments the rotation parameter R could indicate an amount of left rotation rather than right rotation. The repeating pattern is repeated M/N times throughout the mask data value as shown in FIG. 13 (where M is the number of bits comprised by the src1 and mask data values). Hence, the values of N, R and S encoded within the control13 field enable a variety of different masks to be generated for combining with a source data value src1 using the logical operation.

The mask value is combined with the source data value src1 using one of the bitwise AND, OR, or exclusive OR (XOR) operations as shown in FIG. 14. The logical operation can be used, for example, to test, set, clear or invert bit values of particular parts of a data value, or to isolate particular portions of a data value. Note that the mask data value need not actually be generated by the processing circuit 4 but instead the processing circuit 4 may simply generate the final result which has the form that is equivalent to a result of combining the mask with the source data value src1 using the logical operation.

Figure 15:
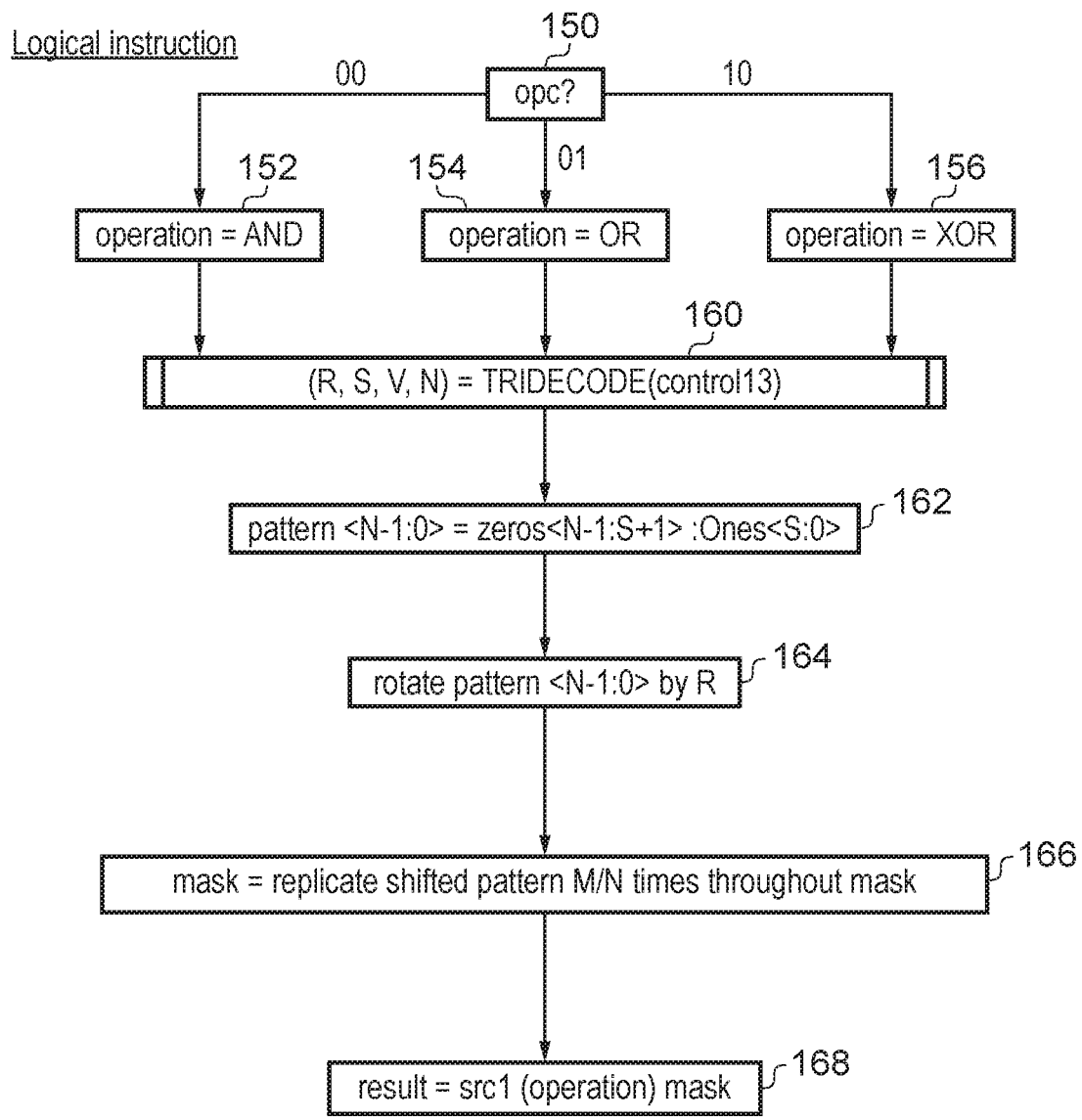
FIG. 15 illustrates an example method of processing a bitwise logical instruction.

FIG. 15 shows a method of processing the bitwise logical instruction of the form shown in FIGS. 11-14. At step 150, the value of the sub-opcode field opc is determined. If the sub-opcode field has a value of 0b00 then the logical operation is determined to be an AND operation at step 152. If the sub-opcode field opc has a value of 0b01 then the logical operation is determined to be an OR operation at step 154. If the sub-opcode field opc has a value of 0b10 then the logical operation is an exclusive OR (XOR) operation as determined at step 156. The opc value of 0b 11 is reserved in this example, but in another embodiment could be assigned to a different form of logical operation.

Regardless of the value of the sub-opcode field opc, then at step 160 the parameters R, S, V and N are determined from the control13 field using the TRIDECODE function as described with reference to FIG. 10. N in this case represents the size of the repeating pattern within the mask to be applied to the source data value. S+1 indicates the number of "1" bits within the mask value. R indicates the position of the "1" bits within the mask value. For the logical instruction, the reversal information V used for the bitfield manipulation instruction is not of interest, and so the value of V returned by the TRIDECODE function is ignored when calculating the result of the logical operation.

At step 162, the repeating pattern of bits is determined. The repeating pattern is initialised as bits <N−1:0>, including bits <N−1:S+1> having a value of "0" and bits <8:0> having a value of "1". At step 164, the repeating pattern of bits is rotated by R bit positions (the rotation may be to the right or to the left as desired, but in the embodiment of FIG. 13 the rotation is to the right).

At step 166, the mask data value is formed by replicating the rotated repeating pattern of bits M/N times throughout the mask, where M is the data value size used for this particular processing operation. For example, M may be determined based on the register access size identified by the sf field of the bitwise logical instruction. Then at step 168, the result data value is generated as the result of combining the first source data value src1 with the mask data value using the logical operation selected at one of steps 152, 154, 156.

Again, the steps of FIG. 15 are merely an example and may be performed in parallel with one another rather than in series. Also, the mask value described at step 166 may not actually be generated by the processing circuit 4 but instead the processing circuit 4 may generate the result data value at step 168 directly from the source data value src1 and the control13 field of the bitwise logical instruction.

Hence, different instructions may use the same format of the control13 field to indicate parameters for controlling an associated processing operation. By using a common encoding to indicate parameters for different kinds of instructions as shown in the examples of FIGS. 5 and 12, some of the hardware for decoding and processing these instructions can be shared, and so the complexity of the processing circuit 4 and the instruction decoder 6 can be reduced.

An example pseudocode for indicating the operations corresponding to the bitfield manipulation instruction and the bitwise logical instruction is indicated below. The operations shown in the pseudocode are merely examples and it is not necessary for the hardware of the processing apparatus 2 to include elements for actually performing these steps. In practice, some of the steps shown in the pseudocode may be performed in parallel with one another rather than as a series of sequential steps. Nevertheless, the pseudocode will be sufficient for the skilled person to be able to produce a hardware embodiment for generating a result data value equivalent to the result of the processing steps indicated in the pseudocode. In the pseudocode, the parameters "from", "to", "width" and "size" respectively correspond to the parameters A, B, W and N as described above. The parameter "datasize" indicates the size M of the source and result data values as described above. The terms "R[n]" and "R[d]" represent the source and destination registers Rn, Rd respectively. In the pseudocode a sequence of 1s and 0s within single quotation marks, such as '110', represents a string of consecutive bits in binary notation. The function UInt converts a string of bits into the unsigned integer value that they represent, so UInt('110') returns the value 6.

The first portion of the pseudocode indicates an example of the TRIDECODE function for decoding the control13 field. The pseudocode corresponds to the operation of FIG. 10. Note that the TRIDECODE function is later used in the processing of both the bitfield manipulation instruction and the bitwise logical instruction.

```
// Decode bitfield immediate control13 to give R, S, V and SIZE control
parameters (integer, integer, bits(6), integer) TRIDECODE(bits(13)
control13)
    integer R;
    integer S;
    integer len;
    bits(6) V = Zeros( );
    len = HighestSetBit(control13<12>:NOT(control13<5:0>));
    if len < 0 then UNDEFINED;
    if len == 0 then
        R = 0;
        S = 0;
    else
        R = UInt(control13<len+5:6>);
        S = UInt(control13<len-1:0>);
    if len < 6 then
        V<5:len> = control13<11:len+6>;
    return (R, S, V, 1 << len);
```

The next portion of pseudocode corresponds to the decoding and execution of the bitfield manipulation instruction:

```
// BITFIELD DECODE
integer n = UInt(Rn);
integer d = UInt(Rd);
integer datasize = if sf == '1' then 64 else 32;
boolean inzero;
boolean extend;
integer R;
integer S;
bits(6) V;
integer size;
integer from;
integer to;
```

```
integer width;
case opc of
    when '00' inzero = true; extend = true; // SBFX/SBFIZ as in Figure 7
    when '01' inzero = false; extend = false; // BFXIL/BFI as in Figure 7
    when '10' inzero = true; extend = false; // UBFX/UBFIZ as in
    Figure 7
    when '11' UNDEFINED;
if datasize == 32 then
    // For a 32-bit data value, there cannot be a 64-bit data
    // element size, so bit <12> of the control 13 field cannot be 1.
    if control13<12> == '1' then
        UNDEFINED;
    // Also, for a 32-bit data value, there cannot be any reordering of
    // groups of 32 bits, so bit <11> of the control13 field also
    cannot be 1.
    elsif control13<11> == '1' then
        UNDEFINED;
// Decode the values of R, S, V and size using the TRIDECODE function
// defined above
(R, S, V, size) = TRIDECODE(control13);
if S >= R then
    // BFX case
    from = R;
    to = 0;
    width = (S + 1) - R;
else
    // BFI case
    from = 0;
    to = size - R;
    width = (S + 1);
// BITFIELD EXECUTE
bits(datasize) operand1 = R[n];
bits(datasize) result;
integer base;
integer src;
integer dst;
integer vbit;
// Initialises the result to zero if inzero is true, or to a copy of destination
register if // inzero is false
result = if inzero then Zeros( ) else R[d];
// Copies a bitfield from each data element of the src operand to a
// corresponding data element of the result
base = 0;
while base < datasize do
    src = base + from;
    dst = base + to;
    result<dst+width-1:dst> = operand1<src+width-1:src>;
    // Perform sign-bit replication if requested
    if extend && to + width < size then
        result<base+size-1:dst+width> =
            Replicate(src<base+S>, size-(to+width));
    base = base + size;
// Reverse adjacent pairs of 2^vbit bits in result if V<vbit> = 1
for vbit = 0 to 5
    if V<vbit> == '1' then
        bits(datasize) tmp = result;
        size = 1 << vbit;
        base = 0;
        while base < datasize do
            result<base+size-1:base> = tmp<base+(2*size)-1:base+
                size>;
            result<base+(2*size)-1:base+size> = tmp<base+
                size-1:base>;
            base = base + (2 * size);
// Write result to destination register
R[d] = result;
```

The next portion of the pseudocode indicates functions for decoding and processing the bitwise logical instruction:

```
// LOGICAL (IMMEDIATE) DECODE
integer R;
integer S;
integer size;
bits(datasize) mask;
integer datasize = if sf == '1' then 64 else 32;
integer n = UInt(Rn);
```

```
                integer d = UInt(Rd);
                LogicalOp opcode;
                // opc defines the type of logical operation to be applied
                case opc of
                    when '00' opcode = LogicalOp_AND;
                    when '01' opcode = LogicalOp_OR;
                    when '10' opcode = LogicalOp_EOR;
                    otherwise UNDEFINED;
                // For a 32-bit data value, there cannot be 64-bit pattern repetition
                size
                if datasize == 32 && control13<12> == '1' then UNDEFINED;
                // Decode R, S and size using the TRIDECODE function described
                // above, and ignore the returned value of V
                (R, S, -, size) = TRIDECODE(control13);
                // Determine the mask based on R, S and size
                bits(size) pattern = Zeros(size-(S+1)):Ones(S+1);
                pattern = ROR(pattern, R);
                mask = Replicate(pattern, datasize DIV size);
                // LOGICAL (IMMEDIATE) EXECUTE
                bits(datasize) operand1 = R[n];
                bits(datasize) operand2 = mask;
                bits(datasize) result;
                // Generate result by combining source and mask operands using the
                // selected logical operation
                case opcode of
                    when LogicalOp_AND result = operand1 AND operand2;
                    when LogicalOp_OR result = operand1 OR operand2;
                    when LogicalOp_EOR result = operand1 EOR operand2;
                // Write result to destination register
                R[d] = result;
```

The next portion of pseudocode indicates an example of another kind of instruction that may use the control13 encoding. The extract instruction results in a data value comprising a number of result data elements, each result data element corresponding to a selected portion of a value formed by concatenating the corresponding first source data element of a first source operand (operand1) and the corresponding second source data element of a second source operand (operand2). The control13 value in this example defines the data element size and a value "lsb" indicating which portion of the concatenated first and second source data elements is to be included in the result data element. The data element size and "lsb" value correspond to the values of N and S returned from the TRIDECODE function, while the values of V and R returned by the TRIDECODE function are ignored.

```
                // EXTRACT DECODE
                integer datasize = if sf == '1' then 64 else 32;
                integer n = UInt(Rn);
                integer m = UInt(Rm);
                integer d = UInt(Rd);
                integer lsb;
                integer size;
                bits(13) control13;
                if datasize == 32 && N == '1' then UNDEFINED;
                control13 = N:Zeros(6):imm6;
                (-, lsb, -, size) = TRIDECODE(control13);
                // EXTRACT EXECUTE
                bits(datasize) operand1 = R[n];
                bits(datasize) operand2 = R[m];
                bits(datasize) result;
                bits(2*size) concat;
                integer bbit = 0;
                while bbit < datasize
                    integer ebit = bbit + size - 1;
                    concat = operand1<ebit:bbit> : operand2<ebit:bbit>;
                    result<ebit:bbit> = concat<lsb+size-1:lsb>;
                    bbit = bbit + size;
                R[d] = result;
```

Figure 16:
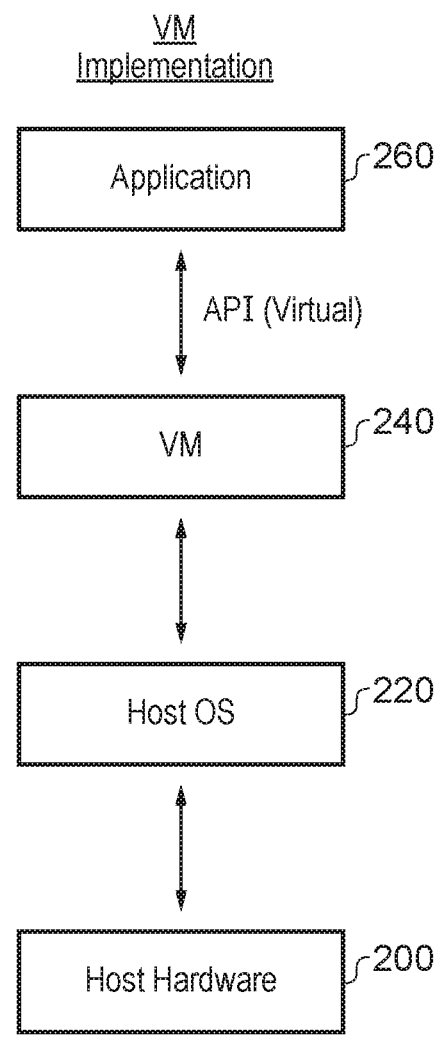
FIG. 16 illustrates an example of a virtual machine implementation.

FIG. 16 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 200 running a host operating system 220 supporting a virtual machine program 240. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 240 provides an application program interface to an application program 260 which is the same as the application program interface which would be provided by the real hardware which is the device being modeled by the virtual machine program 240. Thus, the program instructions, including the control of memory accesses, may be executed from within the application program 260 using the virtual machine program 240 to model the interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
processing circuitry configured to perform processing operations; and
an instruction decoder responsive to program instructions to generate control signals for controlling said processing circuitry to perform said processing operations, wherein:
said program instructions include at least one single-instruction-multiple-data (SIMD) instruction identifying a source data value comprising at least one source data element, and specifying a control value having a first portion for indicating a selected data element size of each source data element of said source data value, said selected data element size selected from a plurality of data element sizes, said control value also having a second portion for indicating a plurality of control parameters having a number of bits that varies in dependence on said selected data element size, said first portion and said second portion each having a variable number of bits;
the at least one SIMD instruction has an encoding in which at least one bit of the control value used to represent part of said first portion when the selected data element size is a first data size is also used to represent part of said second portion when the selected data element size is a second data size;
said instruction decoder is responsive to said at least one SIMD instruction to generate control signals for controlling said processing circuitry to perform a corresponding processing operation on each of said at least one source data element of said source data value, in dependence on said selected data element size and said plurality of control parameters;
when processing said at least one SIMD instruction, at least one of said instruction decoder and said processing circuitry is configured to identify the number of bits comprised by said first portion of said control value and, in dependence on said number of bits comprised by said first portion, to identify (a) said selected data element size, and (b) which bits of said control value form said second portion for indicating said plurality of control parameters;

when processing said at least one SIMD instruction, said at least one of said instruction decoder and said processing circuitry is configured to identify, in dependence on said number of bits comprised by said first portion, which bits of said second portion indicate each of said plurality of control parameters;

said plurality of control parameters comprise at least a first control parameter having a number of bits that increases as said selected data element size increases, and a second control parameter having a number of bits that decreases as said selected data element size increases; and said second portion includes a sub-portion for indicating said first control parameter and said second control parameter, said at least one of said instruction decoder and said processing circuitry identifying, in dependence on said number of bits comprised by said first portion, which bits of said sub-portion indicate said first control parameter and which bits of said sub-portion indicate said second control parameter.

2. The data processing apparatus according to claim 1, wherein the number of bits of said first portion increases in dependence on said selected data element size as the number of bits of said second portion decreases in dependence on said selected data element size.

3. The data processing apparatus according to claim 1, wherein for at least a subset of said plurality of data element sizes, said first portion comprises at least a first bit having a first state and X remaining bits having a second state, where X is a variable integer greater than, or equal to, 0; and said at least one of said instruction decoder and said processing circuitry is configured to identify the number of bits comprised by said first portion of said control value in dependence on a bit position of said first bit within a predetermined portion of said control value.

4. The data processing apparatus according to claim 3, wherein said first portion comprises at least one additional bit for providing further information for identifying said selected data element size.

5. A virtual machine provided by a computer program stored on a non-transitory computer-readable storage medium, which, when executed by a computer, provides an instruction execution environment according to the data processing apparatus as claimed in claim 1.

6. A data processing apparatus comprising:
processing circuitry configured to perform processing operations; and
an instruction decoder responsive to program instructions to generate control signals for controlling said processing circuitry to perform said processing operations, wherein:
said program instructions include at least one single-instruction-multiple-data (SIMD) instruction identifying a source data value comprising at least one source data element, and specifying a control value having a first portion for indicating a selected data element size of each source data element of said source data value, said selected data element size selected from a plurality of data element sizes, said control value also having a second portion for indicating at least one control parameter having a number of bits that varies in dependence on said selected data element size, said first portion and said second portion each having a variable number of bits;

the at least one SIMD instruction has an encoding in which at least one bit of the control value used to represent part of said first portion when the selected data element size is a first data size is also used to represent part of said second portion when the selected data element size is a second data size;

said instruction decoder is responsive to said at least one SIMD instruction to generate control signals for controlling said processing circuitry to perform a corresponding processing operation on each of said at least one source data element of said source data value, in dependence on said selected data element size and said at least one control parameter;

when processing said at least one SIMD instruction, at least one of said instruction decoder and said processing circuitry is configured to identify the number of bits comprised by said first portion of said control value and, in dependence on said number of bits comprised by said first portion, to identify (a) said selected data element size, and (b) which bits of said control value form said second portion for indicating said at least one control parameter; and said at least one SIMD instruction includes a bitfield manipulation instruction and for said bitfield manipulation instruction:

said corresponding processing operation comprises generating a result data value comprising at least one result data element, each result data element corresponding to a corresponding source data element of said source data value;

each result data element comprises a result bitfield having bit values corresponding to bit values of a source bitfield of consecutive bits within said corresponding source data element; and said at least one control parameter indicates the number of bits comprised by said source bitfield and said result bitfield, a position of said source bitfield within said corresponding source data element, and a position of said result bitfield within said at least one result data element.

7. The data processing apparatus according to claim 6, wherein for said bitfield manipulation instruction, if said source data value comprises a plurality of source data elements and said result data value comprises a plurality of result data elements, then said at least one control parameter also includes a data element ordering parameter for indicating an order with which said plurality of result data elements are arranged within said result data value.

8. A virtual machine provided by a computer program stored on a non-transitory computer-readable storage medium, which, when executed by a computer, provides an instruction execution environment according to the data processing apparatus as claimed in claim 6.

9. A data processing apparatus comprising:
processing means for performing processing operations; and
instruction decoding means for, in response to program instructions, generating control signals for controlling said processing means to perform said processing operations, wherein:
said program instructions include at least one single-instruction-multiple-data (SIMD) instruction identifying a source data value comprising at least one source data element, and specifying a control value having a first portion for indicating a selected data element size of each source data element of said source data value, said selected data element size selected from a plurality of data element sizes, said control value also having a second portion for indicating a plurality of control parameters having a number of bits that varies in dependence on said selected data element size, said first portion and said second portion each having a variable number of bits;

the at least one SIMD instruction has an encoding in which at least one bit of the control value used to represent part of said first portion when the selected data element size is a first data size and is also used to represent part of said second portion when the selected data element size is a second data size;

said instruction decoding means is responsive to said at least one SIMD instruction to generate control signals for controlling said processing means to perform a corresponding processing operation on each of said at least one source data element of said source data value, in dependence on said selected data element size and said plurality of control parameters;

when processing said at least one SIMD instruction, at least one of said instruction decoding means and said processing means is configured to identify the number of bits comprised by said first portion of said control value and, in dependence on said number of bits comprised by said first portion, to identify (a) said selected data element size, and (b) which bits of said control value form said second portion for indicating said plurality of control parameters;

when processing said at least one SIMD instruction, said at least one of said instruction decoding means and said processing means is configured to identify, in dependence on said number of bits comprised by said first portion, which bits of said second portion indicate each of said plurality of control parameters;

said plurality of control parameters comprise at least a first control parameter having a number of bits that increases as said selected data element size increases, and a second control parameter having a number of bits that decreases as said selected data element size increases; and said second portion includes a sub-portion for indicating said first control parameter and said second control parameter, said at least one of said instruction decoding means and said processing means identifying, in dependence on said number of bits comprised by said first portion, which bits of said sub-portion indicate said first control parameter and which bits of said sub-portion indicate said second control parameter.

10. A data processing method for a processing apparatus for performing processing operations in response to program instructions, the method comprising:

receiving at least one single-instruction-multiple-data (SIMD) instruction identifying a source data value comprising at least one source data element, and specifying a control value having a first portion for indicating a selected data element size of each source data element of said source data value, said selected data element size selected from a plurality of data element sizes, said control value also having a second portion for indicating a plurality of control parameters having a number of bits that varies in dependence on said selected data element size, said first portion and said second portion each having a variable number of bits, wherein the at least one SIMD instruction has an encoding in which at least one bit of the control value used to represent part of said first portion when the selected data element size is a first data size is also used to represent part of said second portion when the selected data element size is a second data size;

in response to said at least one SIMD instruction, identifying the number of bits comprised by said first portion of said control value;

in dependence on said number of bits comprised by said first portion, identifying (a) said selected data element size, and (b) which bits of said control value form said second portion for indicating said plurality of control parameters;

controlling said processing apparatus to perform a corresponding processing operation on each of said at least one source data element of said source data value, in dependence on said selected data element size and said plurality of control parameters; and identifying, in dependence on said number of bits comprised by said first portion, which bits of said second portion indicate each of said plurality of control parameters, wherein:

said plurality of control parameters comprise at least a first control parameter having a number of bits that increases as said selected data element size increases, and a second control parameter having a number of bits that decreases as said selected data element size increases; and said second portion includes a sub-portion for indicating said first control parameter and said second control parameter, at least one of an instruction decoder and processing circuitry identifying, in dependence on said number of bits comprised by said first portion, which bits of said sub-portion indicate said first control parameter and which bits of said sub-portion indicate said second control parameter.

* * * * *